(12) United States Patent
Cui et al.

(10) Patent No.: US 12,627,777 B2
(45) Date of Patent: May 12, 2026

(54) IMAGE DISPLAY METHOD AND APPARATUS, LASER PROJECTION DEVICE, AND STORAGE MEDIUM

(71) Applicant: HISENSE LASER DISPLAY CO., LTD., Shandong (CN)

(72) Inventors: Rongrong Cui, Shandong (CN); Dabo Guo, Shandong (CN)

(73) Assignee: HISENSE LASER DISPLAY CO., LTD., Qingdao (CN)

( * ) Notice: Subject to any disclaimer, the term of this patent is extended or adjusted under 35 U.S.C. 154(b) by 0 days.

(21) Appl. No.: 18/882,055

(22) Filed: Sep. 11, 2024

(65) Prior Publication Data

US 2025/0008063 A1 Jan. 2, 2025

Related U.S. Application Data

(63) Continuation of application No. PCT/CN2023/076084, filed on Feb. 15, 2023.

(30) Foreign Application Priority Data

Mar. 9, 2022 (CN) ......................... 202210226688.X
Mar. 28, 2022 (CN) ......................... 202210314704.0

(51) Int. Cl.
*H04N 9/31* (2006.01)

(52) U.S. Cl.
CPC ......... *H04N 9/3161* (2013.01); *H04N 9/3155* (2013.01)

(58) Field of Classification Search
CPC ............................ H04N 9/3161; H04N 9/3155
See application file for complete search history.

(56) References Cited

U.S. PATENT DOCUMENTS 5,673,060 A 9/1997 Blaxtan et al.
6,201,521 B1 3/2001 Doherty
(Continued)

FOREIGN PATENT DOCUMENTS

CN 103680372 A 3/2014
CN 104917977 A 9/2015
(Continued)

OTHER PUBLICATIONS

Zhou, Hao, "Research on High Frame Rate DMD Driving Technology Based on FPGA", Dissertation submitted to University of Chinese Academy of Sciences, Apr. 2014.
(Continued)

*Primary Examiner* — Robert J Michaud
(74) *Attorney, Agent, or Firm* — Workman Nydegger

(57) ABSTRACT

Embodiments of the present application relate to the field of images, and disclose an image display method and apparatus, a laser projection device, and a storage medium. In the embodiments of the present application, a first time period for loading data of an image to be displayed for a target micromirror unit group is within an allowed reset display time period of a first micromirror unit group. That is, any micromirror unit group may use the allowed reset display time of another micromirror unit group that is displaying data to perform data loading, so as to reduce the time occupied by data loading in the image display process, thereby shortening a duration required for image display, and increasing the frame rate of image display.

17 Claims, 7 Drawing Sheets

(56)  References Cited

U.S. PATENT DOCUMENTS

| 2005/0146542 | A1 | | 7/2005 | Hewlett et al. | |
| 2011/0255140 | A1 | * | 10/2011 | Medin | G02B 26/0841 |
| | | | | | 359/225.1 |
| 2021/0289177 | A1 | | 9/2021 | Xiao et al. | |
| 2022/0373150 | A1 | * | 11/2022 | Reisinger | F21S 41/285 |

FOREIGN PATENT DOCUMENTS

| CN | 107659800 | A | * | 2/2018 | H04N 9/3179 |
| CN | 107818773 | A | | 3/2018 | |
| CN | 112242125 | A | | 1/2021 | |
| CN | 112905514 | A | | 6/2021 | |
| CN | 113141438 | A | | 7/2021 | |
| CN | 114630091 | A | | 6/2022 | |
| CN | 114710651 | A | | 7/2022 | |
| JP | 2007293053 | A | | 11/2007 | |

OTHER PUBLICATIONS

Chinese Notification to Grant Patent Right for Invention, mailed Jan. 15, 2024, for Chinese Application No. 202210226688.X.
Chinese Notification to Grant Patent Right for Invention, mailed Jan. 15, 2024, for Chinese Application No. 202210314704.0.
International Search Report, mailed Jun. 5, 2023, for PCT Application No. PCT/CN2023/076084.

* cited by examiner

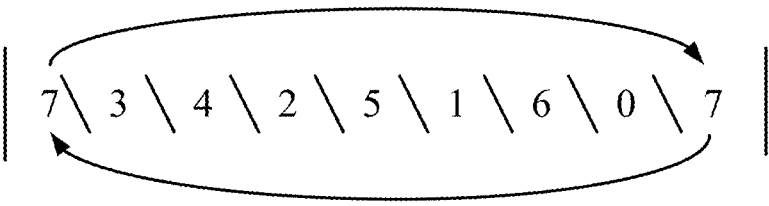

Fig. 6

| Determining a target bit plane corresponding to the target micro-mirror unit group in the micro-mirror unit array | ⌐201 |

| Based on a binary pixel value of each micro-mirror unit of the target micro-mirror unit group, loading target data on the target bit plane to the target micro-mirror unit group, so that the target micro-mirror unit group displays based on the target data | ⌐202 |

Fig. 7

IMAGE DISPLAY METHOD AND APPARATUS, LASER PROJECTION DEVICE, AND STORAGE MEDIUM

CROSS REFERENCE TO RELATED APPLICATION

This application is a continuation of International Application No. PCT/CN2023/076084, filed on Feb. 15, 2023, which claims priorities to Chinese Patent Application No. 202210226688.X, filed on Mar. 9, 2022, and Chinese Patent Application No. 202210314704.0, filed on Mar. 28, 2022, all of which are hereby incorporated by reference in their entireties.

TECHNICAL FIELD

The disclosure relates to the field of images, and in particular to an image display method, apparatus, laser projection apparatus and storage medium.

BACKGROUND

Digital Micro-mirror Device (DMD) is one of main devices of a projection system. The DMD includes a micro-mirror unit array. The micro-mirror unit array includes a plurality of micro-mirror units. Each micro-mirror unit corresponds to a pixel. By controlling a binary grayscale value loaded in a storage unit included in each micro-mirror unit, an "on" state or an "off" state of each micro-mirror unit within a duration of displaying one frame of image, and a duration of the "on" state or a duration of the "off" state can be controlled to control a grayscale value of each pixel in a displayed image, thereby realizing the display of the image.

In the related art, in order to ensure that data of the next bit plane can be loaded to each micro-mirror unit during a process of displaying current data by the micro-mirror unit array, so that after displaying the current data, each micro-mirror unit can immediately reset and display based on the loaded data of the next bit plane, a control device usually controls all the micro-mirror units to reset and display based on the loaded data every time after loading the data to all the micro-mirror units. Since an allowable display duration of each micro-mirror unit depends on a bit plane where the loaded data is located, a reset display duration of data corresponding to a bit plane with a lower bit is shorter. Therefore, in actual applications, it is often the case that the micro-mirror unit that loads data earlier has completed the reset display and needs to load the next data. While waiting for the next data to be loaded, the micro-mirror unit will continue to display, which will cause a display duration of the micro-mirror unit to exceed the allowable display duration, and affect the display quality of the image.

SUMMARY

An embodiment of the disclosure provides an image display method. The method includes: determining bit planes corresponding to a target micro-mirror unit group in a micro-mirror unit array, and determining a display duration of each of the bit planes, where the micro-mirror unit array includes a plurality of micro-mirror unit groups, and each of the micro-mirror unit groups includes a plurality of rows of micro-mirror units, the target micro-mirror unit group is a micro-mirror unit group currently to be loaded with data among the plurality of micro-mirror unit groups; displaying data of a to-be-displayed image in each micro-mirror unit of the target micro-mirror unit group based on the display duration of each of the bit planes; where a first period for loading the data of the to-be-displayed image for the target micro-mirror unit group is within a reset display duration allowed for a first micro-mirror unit group, and the first micro-mirror unit group is a micro-mirror unit group that is currently displaying data among the plurality of micro-mirror unit groups.

An embodiment of the disclosure provides an image display device, including: a processor; a memory storing executable instructions by the processor; where the processor executes the executable instructions in the memory to perform steps of any of the above image display methods.

An embodiment of the disclosure provides a laser projection apparatus, including a light source, an optical engine, a lens and a control device. The optical engine includes a digital micro-mirror device DMD. The control device is configured to control the DMD to perform steps of any of the above image display methods.

An embodiment of the disclosure provides a computer-readable storage medium, storing computer programs. The computer programs are executed by a computer to perform steps of any of the above image display methods.

An embodiment of the disclosure provides a computer program product containing instructions. When running on a computer, the computer program product causes the computer to perform steps of any of the above image display methods.

BRIEF DESCRIPTION OF FIGURES

FIG. 6 is a schematic diagram of a grayscale data loading method according to embodiments of the disclosure.

FIG. 7 is a flow chart of an image display method according to embodiments of the disclosure.

DETAILED DESCRIPTION

In order to make the purpose, technical solutions and advantages of the disclosure clearer, the embodiments of the disclosure will be further described in detail below with reference to the accompanying drawings.

Before explaining the embodiments of the disclosure in detail, a system architecture involved in the embodiments of the disclosure is first introduced.

Figure 1:
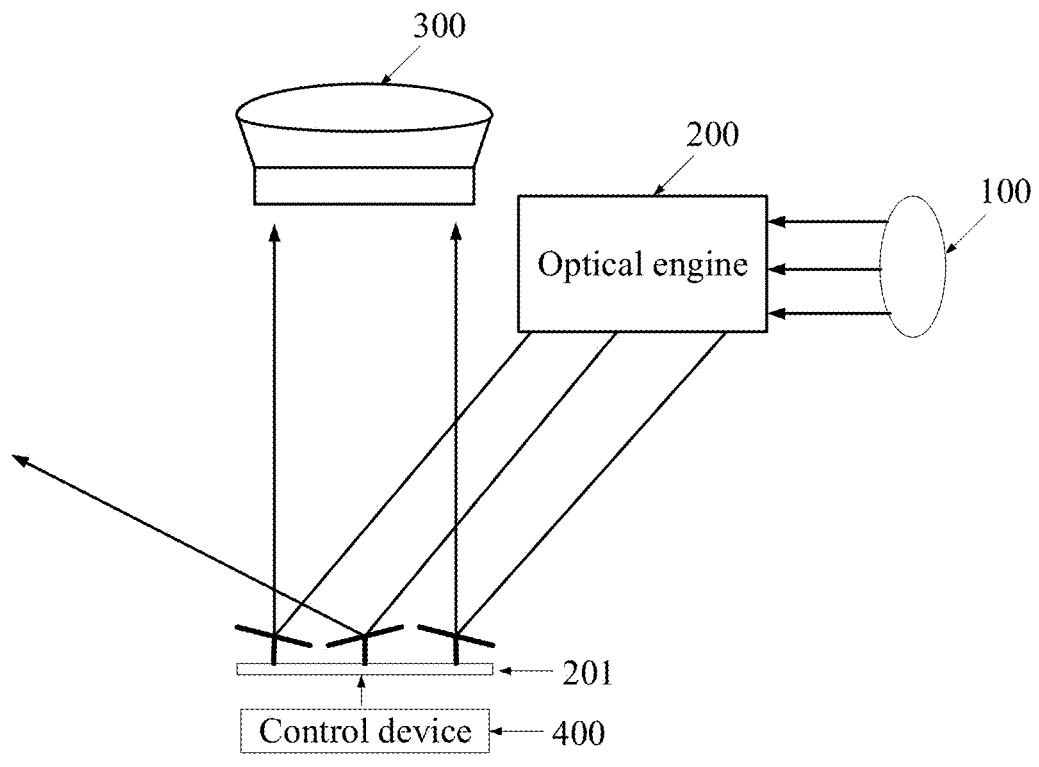
FIG. 1 is an architectural diagram of a display system involved in an image display method according to embodiments of the disclosure.

FIG. 1 is an architectural diagram of a display system involved in an image display method according to embodiments of the disclosure. As shown in FIG. 1, the display system includes a light source 100, an optical engine 200, a lens 300 and a control device 400. The optical engine 200 includes a DMD 201. Here, the DMD 201 includes a micro-mirror unit array. The micro-mirror unit array includes a plurality of micro-mirror units. Each micro-mirror unit can reflect light beams incident on a surface of the each micro-mirror unit.

The control device 400 can divide the micro-mirror unit array into a plurality of micro-mirror unit groups, determine a target micro-mirror unit group from the plurality of micro-mirror unit groups, and then determine a bit plane(s) corresponding to the target micro-mirror unit group, and determine a display duration of each bit plane. Here, the target micro-mirror unit group is a micro-mirror unit group currently to be loaded with data among the plurality of micro-mirror unit groups. Then, based on the display duration of each bit plane, data of a to-be-displayed image is displayed in each micro-mirror unit of the target micro-mirror unit group. Here, a first period for loading the data of the to-be-displayed image for the target micro-mirror unit group is within a reset display duration allowed for a first micro-mirror unit group, and the first micro-mirror unit group is a micro-mirror unit group that is currently displaying data among the plurality of micro-mirror unit groups.

Light beams emitted from the light source 100 can be incident on a surface of each micro-mirror unit included in the micro-mirror unit array after the light beams are refracted and/or reflected by the optical engine 200. When the micro-mirror unit is in an "on" state, the light beams incident on the micro-mirror unit can be reflected to the lens 300. When the micro-mirror unit is in an "off" state, the light beams incident on the micro-mirror unit can be reflected to other directions, so that the reflected light beams cannot be incident to the lens 300. In this way, the control device 400 can control a duration of the light beams reflected by the micro-mirror unit onto the lens 300 by controlling the "on" state or the "off" state of each micro-mirror unit and a duration of the "on" state or the "off" state, thereby controlling a grayscale value of each pixel in a displayed image.

The control device 400 can be a control chip for controlling the DMD 201, or can be other hardware devices capable of controlling the DMD 201, which is not limited in the embodiments of the disclosure.

In addition, the devices in the display system as shown in FIG. 1 are only exemplary devices given in the embodiments of the disclosure. In some possible embodiments, the display system can also include other devices such as light absorbers and digital image processors, which is not repeated in the embodiments of the disclosure.

Figure 2:
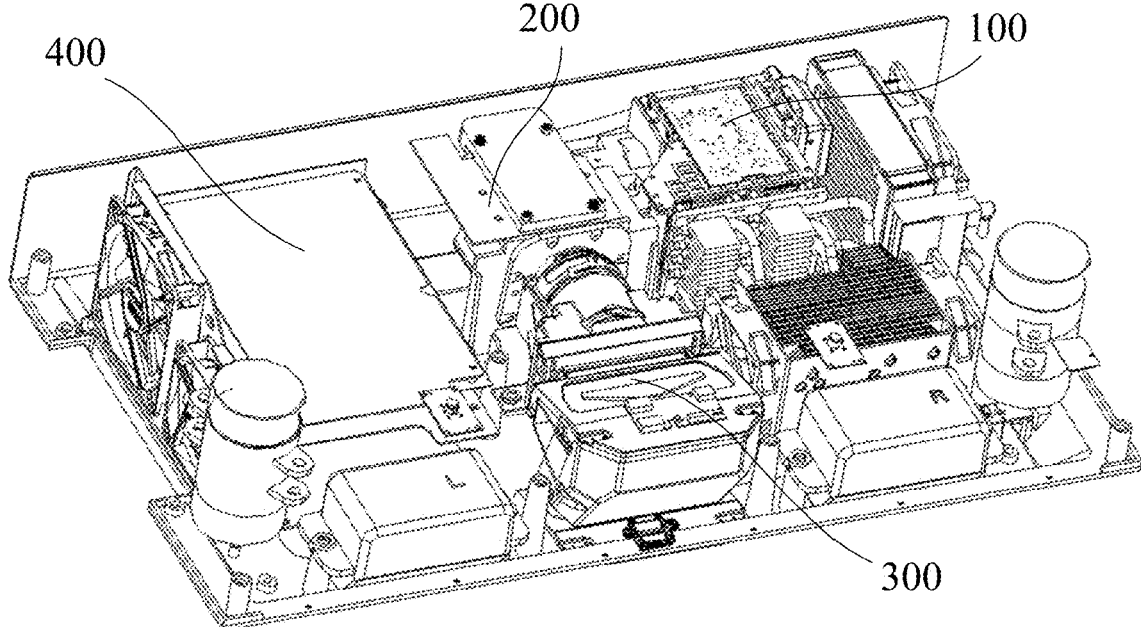
FIG. 2 is a schematic structural diagram of a laser projection apparatus according to embodiments of the disclosure.

Exemplarily, taking the display system as a laser projection apparatus, FIG. 2 is a schematic diagram of a laser projection apparatus according to embodiments of the disclosure. As shown in FIG. 2, after an upper casing of the laser projection apparatus is disassembled, the internal structure is divided according to optical functions, which can include a light source 100, an optical engine 200, a lens 300 and a control device 400. The light source 100 is used to provide a light source illumination beam, and the beam is transmitted to a back-end light modulation device and a lens. The light source 100 can include at least one color laser, such as a blue laser, or the light source 100 can be a two-color laser, such as a blue laser and a red laser, or the light source 100 can be a three-color laser light source, including a laser with red, green, and blue, and can be used to provide a three-color laser illumination beam.

Laser beams from the light source 100 are combined and shaped, and then are incident to an illumination optical-path part of the optical engine 200. In a Digital Light Processing (DLP) projection architecture, the DMD chip is a core light modulation device. The DMD chip receives a drive control signal corresponding to an image signal, flips thousands of tiny mirrors on a surface of the DMD chip to a positive or negative angle corresponding to the drive signal, and reflects the light beams irradiating the surface of the DMD chip into the lens 300.

The lens 300 can be an ultra-short throw projection lens. The ultra-short throw projection lens is used to project image beams onto a projection screen to display the projected image. The laser projection apparatus in the above embodiments can be an ultra-short throw laser projection apparatus.

Figure 3:
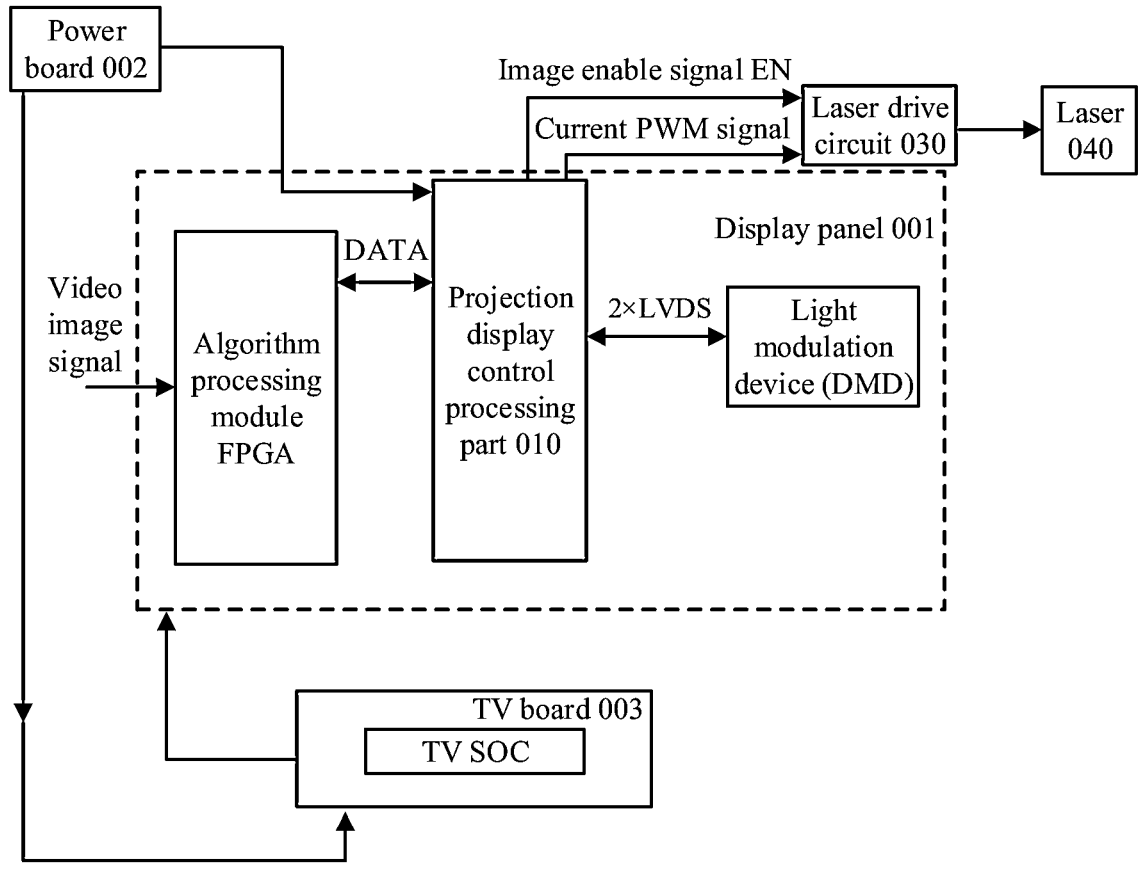
FIG. 3 is a schematic diagram of a circuit architecture of a laser projection apparatus according to embodiments of the disclosure.

Based on the structure of the laser projection apparatus illustrated in FIG. 2 above, FIG. 3 is a schematic diagram of a circuit architecture of a laser projection apparatus according to embodiments of the disclosure.

As shown in FIG. 3, the laser projection apparatus includes: a display panel 001, a power board 002, and a TV board 003. Here, the power board 002 is connected with the display panel 001 and the TV board 003 respectively. The power board 002 can be used to power various devices or some modules on the display panel 001 and the TV board 003. The power board 002 can also be used to power other functional modules in the laser projection apparatus, such as human Eye protection module, electric fan, WIFI module, etc., ensuring normal power supply for all parts of the laser projection apparatus. In some implementations, the power board 002 can also be provided with a laser drive circuit. Alternatively, the laser drive circuit can also be provided independently of the power board 002.

TV board 003 is mainly used for external audio and video signals and decoding.

The TV board 003 is equipped with a System on Chip (SoC), which can decode data in different data formats into a normalized format, and transmit the data in the normalized format to the display panel 001 through, for example, a connector.

Here, a video image signal output from the TV board 003 is transmitted to the display panel 001.

The display panel 001 can be provided with a Field Programmable Gate Array (FPGA) and an algorithm processing module FPGA (or this FPGA may not be set; this FPGA is mainly used for image correction or image decomposition processing, this FPGA may not be set when this function is not needed). The FPGA is used to process an input video image signal, such as Motion Estimate and Motion Compensation (MEMC) frequency multiplication processing, or image correction, etc., to implement image enhancement functions. A projection display control processing part 010 is connected with the algorithm processing module FPGA and is used to receive the processed video image processing signal data as image data to be displayed. It should be noted that FPGA usually exists as an enhanced function module. In some low-cost solutions, this module part may not be provided, but the projection display control processing part 010 receives a video image display signal output from the TV board 003.

The projection display control processing part 010 mainly includes a DLP and can also include a driver chip.

In the DLP control architecture, the light source part needs to cooperate with the DMD chip and an operation timing of the DLP chip. Specifically, the DLP chip outputs an image enable signal. The image enable signal can also be called a primary color light-enable signal, usually expressed as X_EN, and X is an abbreviation for different primary colors of light. The DLP chip further outputs a brightness adjustment signal, which is abbreviated as Pulse Width Modulation (PWM) signal. Along with the DMD chip's sequential modulation process of different primary color image components, the light source part needs to synchronously output primary color light beams of corresponding colors. That is, the DLP chip outputs a primary color light-enable signal to notify the laser light source to enable the lighting of a laser of a certain color, and outputs a PWM signal to notify with what brightness a certain laser in the laser light source should be lit.

Corresponding to FIG. 3, on the one hand, the projection display control processing part 010 is used to generate a modulation drive signal for driving a light modulation device (DMD) according to a to-be-displayed image signal. On the other hand, due to the display of a projection image, it is necessary to synchronously cooperate with the light source beam and the light modulation device, the projection display control processing part 010 further generates a drive signal for driving the light source to emit light. This drive signal can be called an initial drive signal, including an image enable signal EN and a current PWM signal. The image enable signal EN is a timing control signal used to coordinate the timing of light output of different colors. The current PWM signal is a square wave signal used to provide a current signal for lighting the laser.

In addition, in the schematic diagram of the circuit architecture of the laser projection apparatus as shown in FIG. 3, the laser projection apparatus further includes a laser drive circuit 030 for receiving the image enable signal EN and the current PWM signal output from the projection display control processing part 010, and specifically controlling the lighting of the laser 040.

In the illustration, the laser 040 can be a laser of one color or a laser of multiple colors. Usually, a corresponding laser drive circuit 030 is provided corresponding to a laser of each color.

Figure 4:
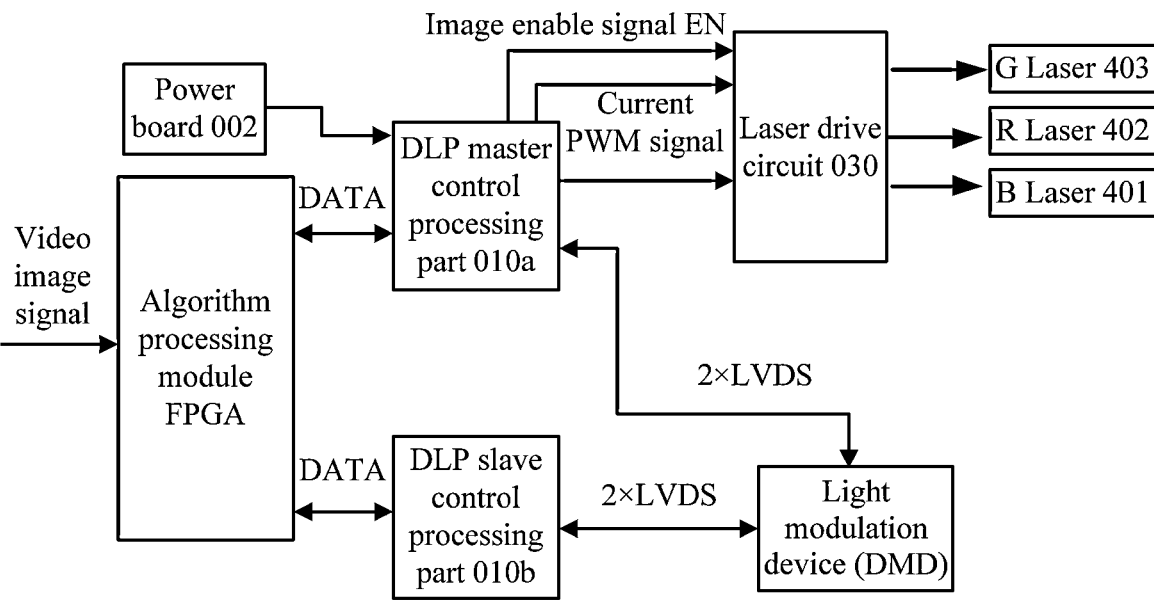
FIG. 4 is a schematic diagram of a circuit architecture of a three-color laser projection apparatus according to embodiments of the disclosure.

In some embodiments, the laser projection apparatus can be a three-color laser projection apparatus, including red, green, and blue lasers. FIG. 4 is a schematic diagram of a circuit architecture of a three-color laser projection apparatus. As shown in FIG. 4, the control processing part 010 corresponding to the projection display in FIG. 3 is illustrated as a DLP master control processing part 010*a* and a DLP slave control processing part 010*b* (it should be noted that the control processing part may also be one, which can be specifically configured according to chip processing capabilities). For example, the control processing part can be two DLP control chips, which can be determined according to the needs of specific circuit function division, which is not limited herein. Here, the DLP master control processing part 010*a* and the DLP slave control processing part 010*b* receive data output from the algorithm processing module FPGA, and are both connected with a light modulation device (DMD).

Further, in the embodiment as shown in FIG. 4, the DLP master control processing part 010*a* outputs the image enable signal EN and the current PWM signal for driving the laser.

Further, in the embodiment as shown in FIG. 4, the laser 040 includes a blue laser 401, a red laser 402 and a green laser 403.

Further, the power board 002 can provide a drive current of 2.9 amps (A) for the red laser, provide a drive current of 2 A for the green laser, and provide a drive current of 3 A for the blue laser.

The laser 040 may include: three groups of lasers of different colors, namely a blue laser 401 for emitting blue laser, a red laser 402 for emitting red laser, and a green laser 403 for emitting green laser. Each of the above-mentioned lasers can be a Multi chipped Laser (MCL).

The above-mentioned three-color lasers can be individually packaged light-emitting units, such as three sets of MCL lasers, or can be multi-color chips packaged in one light-emitting unit, such as an MCL laser equipped with multiple rows of light-emitting chips of different colors. Each light-emitting unit can output three-color laser.

In the embodiments of the disclosure, the micro-mirror unit puts itself in a light-on state or a light-off state based on the data stored in Complementary Metal Oxide Semiconductor (CMOS). The specific process is as follows.

Figure 5:
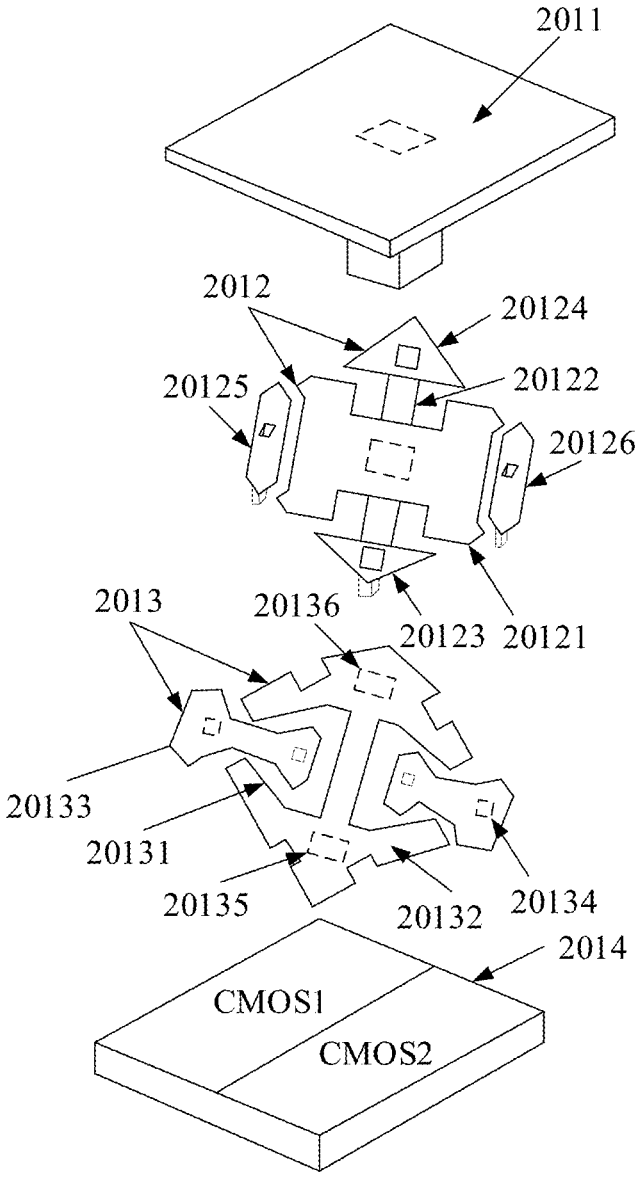
FIG. 5 is a schematic structural diagram of a micro-mirror unit according to embodiments of the disclosure.

Referring to FIG. 5, for any micro-mirror unit in the micro-mirror unit array included in the DMD 201, the structure is as shown in FIG. 5. The micro-mirror unit includes a micro-mirror 2011, a connection layer 2012, a metal layer 2013 and a CMOS layer 2014. Here, a support pillar is provided on a bottom surface of the micro-mirror 2011; the connection layer 2012 includes a yoke plate 20121, a hinge 20122, a first hinge support pillar 20123, a second hinge support pillar 20124, a first addressing electrode 20125 and a second addressing electrode 20126; the metal layer 2013 includes a first landing platform 20131, a second landing platform 20132, a first addressing metal plate 20133, a second addressing metal plate 20134, a first reset bias electrode 20135 and a second reset bias electrode 20136; the CMOS layer 2014 includes CMOS1 and CMOS2. The micro-mirror 2011 is connected with the yoke plate 20121 of the connection layer 2012 through the support pillar on the bottom surface of the micro-mirror 2011. The yoke plate 20121 is fixed on the hinge 20122. One end of the hinge 20122 is connected with the first hinge support pillar 20123, and the other end of the hinge 20122 is connected with the second hinge support pillar 20124. The first hinge support pillar 20123 is connected with the first reset bias electrode 20135, the second hinge support pillar 20124 is connected with the second reset bias electrode 20136, the first addressing electrode 20125 is connected with one end of the first addressing metal plate 20133, the other end of the first addressing metal plate 20133 is connected with CMOS1, the second addressing electrode 20126 is connected with one end of the second addressing metal plate 20134, and the other end of the second addressing metal plate 20134 is connected with CMOS2.

The first reset bias electrode 20135, the second reset bias electrode 20136, the first hinge support pillar 20123, the second hinge support pillar 20124, the hinge 20122, the yoke plate 20121 and the micro-mirror 2011 included in the micro-mirror unit can be electrically conductive. Therefore, the control device 400 can control the voltage on the micro-mirror 2011 by loading the first reset bias electrode 20135 or the second reset bias electrode 20136 with a bias voltage or a reset voltage, where the bias voltage is a positive voltage, such as 18V, the reset voltage is a negative voltage, such as −14V.

As can be seen from the above introduction, one end of the first addressing metal plate 20133 is connected with CMOS1, and the other end of the first addressing metal plate 20133 is connected with the first addressing electrode 20125. Based on this, the control device 400 can load data into CMOS1, so that CMOS1 controls a voltage on the first addressing metal plate 20133 to be a first voltage or zero, based on the loaded data. Here, the first voltage is a positive voltage, such as 5V. When a binary number loaded into CMOS1 by the control device 400 is 1, CMOS1 controls the voltage on the first addressing metal plate 20133 to be the first voltage. At this time, the voltage on the first addressing electrode 20125 is also the first voltage. When the data loaded into CMOS1 by the control device 400 is 0, CMOS1 controls the voltage on the first addressing metal plate 20133 to be zero. At this time, the voltage on the first addressing electrode 20125 is also zero.

In addition, in the micro-mirror unit of the embodiments of the disclosure, the data loaded into CMOS1 and CMOS2 are complementary. That is, if the data loaded by the control device 400 into CMOS1 is 1, data 0 will be automatically loaded into CMOS2. If the data loaded by the control device 400 into CMOS1 is 0, data 1 will be automatically loaded into CMOS2. Therefore, when CMOS1 controls the voltage on the first addressing electrode 20125 to be the first voltage based on data 1, the voltage on the second addressing electrode 20126 corresponding to CMOS2 is zero. When CMOS1 controls the voltage on the first addressing electrode 20125 to be zero based on data 0, the voltage on the second addressing electrode 20126 corresponding to CMOS2 is the first voltage. It can be seen that no matter whether the data loaded into CMOS1 is 0 or 1, the voltages on the first addressing electrode 20125 and the second addressing electrode 20126 are different.

When CMOS1 is loaded with data 0, the voltage on the first addressing electrode 20125 is zero, and the voltage on the second addressing electrode 20126 is the first voltage. At this time, if the control device 400 loads a bias voltage to the micro-mirror 2011 through the first reset bias electrode 20135 or the second reset bias electrode 20136, then a voltage difference between the first addressing electrode 20125 and the upper micro-mirror 2011 is greater than a voltage difference between the second addressing electrode 20126 and the upper micro-mirror 2011, which causes an electrostatic force between the first addressing electrode 20125 and the upper micro-mirror 2011 to be greater than an electrostatic force between the second addressing electrode 20126 and the upper micro-mirror 2011. Based on this, the micro-mirror 2011 in a released state will drive the hinge 20122 and the yoke plate 20121 to deflect in a direction close to the first addressing electrode 20125 until the yoke plate 20121 contacts the first landing platform 20131. At this time, light beams emitted from the light source 100 are incident onto the surface of the micro-mirror 2011 after the light beams are refracted and/or reflected by the optical engine 200, and then incident onto a light absorber after being reflected by the surface of the micro-mirror 2011. In the embodiments of the disclosure, a state of the micro-mirror 2011 when a light beam is incident onto a light absorber is called a light-off state.

Similarly, when the data loaded into CMOS1 is 1, the voltage on the first addressing electrode 20125 is the first voltage, the voltage on the second addressing electrode 20126 is zero, and the voltage loaded on the micro-mirror 2011 is the bias voltage, a voltage difference between the first addressing electrode 20125 and the upper micro-mirror 2011 is less than a voltage difference between the second addressing electrode 20126 and the upper micro-mirror 2011, resulting in an electrostatic force between the first addressing electrode 20125 and the upper micro-mirror 2011 being smaller than an electrostatic force between the second addressing electrode 20126 and the upper micro-mirror

2011. At this time, the micro-mirror 2011 in a released state will drive the hinge 20122 and the yoke plate 20121 to deflect in a direction close to the second addressing electrode 20126, until the yoke plate 20121 contacts the second landing platform 20132. At this time, light beams emitted from the light source 100 are incident onto the surface of the micro-mirror 2011 after the light beams are refracted and/or reflected by the optical engine 200, and then incident onto the lens 300 after being reflected by the surface of the micro-mirror 2011. In the embodiments of the disclosure, a state of the micro-mirror 2011 when a light beam is incident onto a lens 300 is called a light-on state.

It should be noted that after the micro-mirror 2011 is in the light-off state or the light-on state for a display duration, the control device 400 can load a reset voltage to the micro-mirror 2011 through the first reset bias electrode 20135 or the second reset bias electrode 20136 to make the micro-mirror 2011 release to end the display of current data. After the micro-mirror 2011 is released, a bias voltage is applied to the micro-mirror 2011 to control the micro-mirror 2011 to deflect again to display the next data, and this process is repeated to display one frame of image.

Here, the micro-mirror 2011 returns to a release of the micro-mirror from the light-on state or the light-off state at this moment, and then deflects from an original state to the next light-on state or the next light-off state, which is called the reset of the micro-mirror. A duration used for the resetting of the micro-mirror 2011 is a micro-mirror reset duration, that is, during the resetting of the micro-mirror, the control device 400 cannot load data into CMOS1.

In the embodiments of the disclosure, the DMD image display method uses PWM to divide the time of one frame of signal into several binary bit times. Different grayscale bits correspond to different binary bit times. Taking an 8-bit image as an example, color data of each pixel uses 24 bit RGB (Red, Green, Blue), and each color data is 8 bits, then the 8-bit image has $2^8=256$ grayscale levels, that is, 0 to 255 grayscale values. The grayscale values are arranged in an 8-bit binary format. The 8-bit binary format is represented by:

$$G =$$
$$b_0 \times 2^0 + b_1 \times 2^1 + b_2 \times 2^2 + b_3 \times 2^3 + b_4 \times 2^4 + b_5 \times 2^5 + b_6 \times 2^6 + b_7 \times 2^7.$$

For any n-bit grayscale, a formula for calculating the corresponding grayscale value is:

$$G = \sum_{i=1}^{n} 2^{i-1} b_{i-1}.$$

Here, $b_{i-1}$ is a binary value corresponding to n bits, and the binary value has only two values 0 or 1. $2^{i-1}$ is the weight of the corresponding binary bit, that is, the time interval.

Therefore, exemplarily, when displaying a frame of image, taking 8-bit grayscale as an example, according to the above content, a grayscale of the frame of image is divided into 8 bits of data, and each bit of data corresponds to 8 different time interval lengths, respectively 1, 2, 4, 8, 16, 32, 64, and 128. Since the higher the bit is, the greater the weight of the time interval is, when loading 8 times of grayscale data, time durations of micro-mirror units of different bit data are different. The higher the bit is, the longer the time duration of the micro-mirror unit is, but within one frame time, 8-bit grayscale data of different bits are downloaded into CMOS of the micro-mirror unit in 8 separate times. Due to the fact that a download order of the 8-bit data does not follow a sequence from low bit to high bit or a sequence from high bit to low bit, it does not affect the grayscale value of the image, that is, it will not affect the grayscale value. Therefore, in the embodiments of the disclosure, a loading order of DMD bit data is not from low bit to high bit or from high bit to low bit to download data, instead, the loading and display order of bit grayscale data in FIG. 6 is used, that is, the third bit of data is downloaded first, and the micro-mirror unit remains at the $2^3$ weighted time. When the third bit of time interval is reached, the fourth bit of grayscale data is loaded and displayed. In the same principle, the loading and display order of 8-bit grayscale data is the third bit, the fourth bit, the second bit, the fifth bit, the first bit, the sixth bit, the zeroth bit, the seventh bit, and the process goes to the next cycle in sequence. The reason for using the above data loading and display method is that bit time period lengths (different bit weights) of different bits are different. When displaying the next data, a complementary method is used. The longest bit time period and the shortest bit time period are complementary groups. As shown in FIG. 6, the complementary groups includes the seventh bit and the zeroth bit, the third bit and the fourth bit, the second bit and the fifth bit, and the first bit and the sixth bit, and according to the data loading and display order as shown in FIG. 6, the waiting time for loading and displaying the next data can be reduced, thereby increasing data loading and display rate and improving the frame rate.

In specific implementations, still referring to FIG. 1, when determining the bit plane(s) corresponding to the target micro-mirror unit group, the control device 400 specifically determines the target bit plane corresponding to the target micro-mirror unit group. After obtaining the target bit plane corresponding to the target micro-mirror unit group, target data on the target bit plane are loaded to all micro-mirror units in the target micro-mirror unit group based on the binary grayscale value of each micro-mirror unit in the target micro-mirror unit group, to control all micro-mirror units to reset and display based on the loaded data. In addition, the control device 400 can also control reset display durations of all micro-mirror units according to the bit plane corresponding to the loaded data.

Exemplarily, after determining the target bit plane corresponding to the target micro-mirror unit group, the control device 400 can obtain bit data corresponding to the target bit plane from the binary grayscale value of each micro-mirror unit in the target micro-mirror unit group, use the obtained bit data as to-be-loaded data of the corresponding micro-mirror unit, and send the to-be-loaded data to the corresponding micro-mirror unit. Correspondingly, each micro-mirror unit in the target micro-mirror unit group receives the to-be-loaded data sent from the control device 400, stores the to-be-loaded data in CMOS of the corresponding micro-mirror unit, and then puts the micro-mirror unit itself in an "on" state or in an "off" state based on the data stored in CMOS. In addition, the control device 400 can further determine the next time to send to-be-loaded data to each micro-mirror unit in the target micro-mirror unit group according to the target bit plane, so as to achieve the control of a reset display duration of each micro-mirror unit in the target micro-mirror unit group.

Next, the image display method according to the embodiments of the disclosure is introduced. FIG. 7 is an image display method according to embodiments of the disclosure. This method can be applied to the control device introduced in the above embodiments. As shown in FIG. 7, the method includes the following steps.

Step 201: Determining a target bit plane corresponding to the target micro-mirror unit group in the micro-mirror unit array.

DMDs of different specifications include different numbers of micro-mirror units in the micro-mirror unit array. The higher the resolution of the DMD is, the greater the number of micro-mirror units the DMD includes is. In the embodiments of the disclosure, the micro-mirror unit array can be divided into a plurality of micro-mirror unit groups according to the specifications of DMDs, and each micro-mirror unit group includes a plurality of rows of micro-mirror units.

It should be noted that, except for the last micro-mirror unit group among the plurality of micro-mirror unit groups, each micro-mirror unit group includes the same number of rows of micro-mirror units.

For example, in the micro-mirror unit array included in a DMD with a resolution of 1920*1080, the micro-mirror unit array includes 1080 rows of micro-mirror units. The control device can use 72 rows of micro-mirror units as a group to divide the entire micro-mirror unit array into 15 micro-mirror unit groups. Alternatively, the control device can also use 144 rows of micro-mirror units as a group to divide the first 1008 rows of micro-mirror units into 7 micro-mirror unit groups and to divide the last 72 rows of micro-mirror units into 1 micro-mirror unit group. Alternatively, the control device can also use 288 rows of micro-mirror units as a group to divide the first 864 rows of micro-mirror units into 3 micro-mirror unit groups and to divide the last 216 rows of micro-mirror units into 1 micro-mirror unit group.

Optionally, each of the plurality of micro-mirror unit groups includes at least one sub-array, and each sub-array includes a plurality of rows of micro-mirror units.

That is, the control device can also divide the micro-mirror unit array into a plurality of sub-arrays, where each sub-array includes a plurality of rows of micro-mirror units. After obtaining the plurality of sub-arrays, the control device can further divide at least one sub-array into a micro-mirror unit group to obtain the plurality of micro-mirror unit groups. Except for the last micro-mirror unit group, the number of sub-arrays included in the remaining micro-mirror unit groups is the same.

Still taking the above example as an example, starting from the first row, the control device can divide the 1080 rows of micro-mirror units into 15 sub-arrays by using adjacent 72 rows of micro-mirror units as one sub-array in sequence. Afterwards, two sub-arrays or four sub-arrays are divided into one micro-mirror unit group to obtain the plurality of micro-mirror unit groups.

For the plurality of micro-mirror unit groups included in the micro-mirror unit array, the control device can obtain a data loading duration required for each micro-mirror unit group in the plurality of micro-mirror unit groups; determine a reset display duration of each bit plane in the plurality of bit planes, and then, based on the data loading duration required for each micro-mirror unit group and the reset display duration of each bit plane, determine the target bit plane corresponding to the target micro-mirror unit group. The plurality of bit planes are determined based on gray levels of an image displayed by the micro-mirror unit array, and the plurality of bit planes include the target bit plane.

Here, the control device can determine a data loading duration required for one row of micro-mirror units based on a resolution of the image displayed by the micro-mirror unit array, a data transmission bus bit width and a clock cycle; and determine the data loading duration required for each micro-mirror unit group based on the data loading duration required for one row of micro-mirror units.

Exemplarily, the control device can determine the number of micro-mirror units included in one row of micro-mirror units based on the resolution of the image displayed by the micro-mirror unit array, and determine how many micro-mirror units can be loaded with data in one clock cycle based on the bit width and clock cycle of the data transmission bus, thereby determining the number of clock cycles required to load data for one row of micro-mirror units. After that, the data loading duration required for one row of micro-mirror units is calculated based on a length of one clock cycle and the number of clock cycles required to load data for one row of micro-mirror units, and then the data loading duration required for each micro-mirror unit group is calculated based on the number of rows of micro-mirror units included in each micro-mirror unit group and the data loading duration required for one row of micro-mirror units.

For example, it is assumed that a micro-mirror unit group includes 72 rows, each row includes 1920 micro-mirror units, a 64-bit data transmission bus is used, and a Double Data Rate (DDR) data transmission method is adopted, data is transmitted twice in one clock cycle, that is, 128 bits of data can be transmitted in one clock cycle, so that data can be loaded to 128 micro-mirror units in one clock cycle. Since one row has 1920 micro-mirror units, it takes 15 clock cycles to load data for one row of micro-mirror units. If each clock cycle is 2.5 ns, the data loading duration required for one row of micro-mirror units is 37.5 ns, a data loading duration required for the micro-mirror unit group including 72 rows is 2.7 us.

In addition, in the embodiments of the disclosure, the control device can also determine the plurality of bit planes according to the grayscale level of the image displayed by the micro-mirror unit array, etc., where the number of the plurality of bit planes is equal to the grayscale level.

For example, assuming that the grayscale level of the image displayed by the micro-mirror unit array is 8 bits, it means that the grayscale value of each pixel in the image displayed by the micro-mirror unit array can be represented by an 8-bit binary number, in this case, it is determined that the displayed image corresponds to 8 bit planes. At this time, the first bit data in the binary grayscale value of each pixel of the image in an order from left to right forms the first bit plane, and the second bit data forms the second bit plane, and so on.

For the plurality of bit planes of a to-be-displayed image, the control device may determine a reset display duration of each bit plane. The reset display duration of the bit plane is a sum of a reset duration and a display duration of the bit plane.

It should be noted that the reset duration refers to a duration required for the micro-mirror unit to transition from the "on" state or "off" state at the current moment to the next "on" state or "off" state. Here, each micro-mirror unit in the micro-mirror unit array requires the same reset duration when loading any bit plane, and the reset duration of the micro-mirror unit is related to the model of the DMD. For example, for a DMD with a resolution of 1920*1080, the reset duration of the DMD is 5 us.

The display duration refers to the duration during which the control device controls the micro-mirror unit to remain in the "on" state or "off" state. The display durations of different bit planes are different, and the display duration of each bit plane among the plurality of bit planes is twice the display duration of the adjacent previous bit plane. Based on this, the control device can obtain the display duration of the first bit plane, and then determine the display duration of each of other bit planes based on the display duration of the first bit plane.

Exemplarily, the control device may use the shortest display duration of the micro-mirror unit as the display duration of the first bit plane. For example, assuming that the shortest display duration of the micro-mirror unit is t, the display duration of the first bit plane is t. Based on this, the display duration of the second bit plane is 2 t, the display duration of the third bit plane is 4 t, and so on, the display duration of the eighth bit plane is 128 t.

It should be noted that the shortest display duration of the micro-mirror unit is related to the model of the DMD. For example, for a DMD with a resolution of 1920*1080, the shortest display duration t of the DMD is equal to 8 us.

After obtaining the reset duration and display duration of each bit plane, the control device adds the display duration and reset duration of the corresponding bit plane to obtain the reset display duration of the corresponding bit plane.

After obtaining the data loading duration required for each micro-mirror unit group and the reset display duration of each bit plane, the control device can start the first data loading of each micro-mirror unit group. Here, during the process of the first data loading of each micro-mirror unit group in the micro-mirror unit array, a target micro-mirror unit group is determined based on the position sequence of a plurality of micro-mirror unit groups; a total data loading duration required for second micro-mirror unit groups, that have not yet loaded data, among the plurality of micro-mirror unit groups is determined based on the data loading duration required for each micro-mirror unit group; a remaining reset display duration of a first micro-mirror unit group at the current moment is determined; the target bit plane is determined based on the total data loading duration required for the second micro-mirror unit groups, the remaining reset display duration of the first micro-mirror unit group, and the reset display duration of each bit plane. Wherein, the first micro-mirror unit group is the micro-mirror unit group that is currently displaying data among the plurality of micro-mirror unit groups.

When the control device starts to perform the first data loading on each micro-mirror unit group in the micro-mirror unit array, the control device can firstly take the first micro-mirror unit group in the micro-mirror unit array as the target micro-mirror unit group according to the position sequence of each micro-mirror unit group.

Since the first micro-mirror unit group is the micro-mirror unit group that is loaded with data for the first time, the micro-mirror unit groups except for the first micro-mirror unit group are not loaded with data, so the micro-mirror unit groups except for the first micro-mirror unit group are all second micro-mirror unit groups. At this time, the control device can obtain the data loading duration required for each micro-mirror unit group after the first micro-mirror unit group, and the sum of data loading durations required for each of the micro-mirror unit groups after the first micro-mirror unit group is used as the total data loading duration required for the second micro-mirror unit groups.

After obtaining the total data loading duration required for the second micro-mirror unit groups, the control device can make a difference between the reset display duration of each bit plane and the data loading duration required for the first micro-mirror unit group to obtain a plurality of first difference values, where each first difference value corresponds to a bit plane. After obtaining the plurality of first difference values, the control device can compare the plurality of first difference values with the total data loading duration required for the second micro-mirror unit groups, and determine the bit plane corresponding to a first difference that is not less than the total data loading duration required for the second micro-mirror unit groups as a first candidate bit plane, thereby obtaining at least one first candidate bit plane. Afterwards, the control device can use any one of the at least one first candidate bit plane as a target bit plane corresponding to the first micro-mirror unit group.

Exemplarily, assuming that the obtained first candidate bit plane includes the third to eighth bit planes, the control device may use any one of the third to eighth bit planes as the target bit plane corresponding to the first micro-mirror unit group.

For the $i^{th}$ micro-mirror unit group after the first micro-mirror unit group, the control device can use the $i^{th}$ micro-mirror unit group as the target micro-mirror unit group after loading data for the $(i-1)^{th}$ micro-mirror unit group. Because after determining the target bit plane corresponding to the $(i-1)^{th}$ micro-mirror unit group, the control device can load data for all micro-mirror units of the $(i-1)^{th}$ micro-mirror unit group, so that each micro-mirror unit of the $(i-1)^{th}$ micro-mirror unit group can reset and display based on the loaded data. Therefore, when loading data for the $i^{th}$ micro-mirror unit group, the micro-mirror unit groups before the $i^{th}$ micro-mirror unit group are all in the reset display duration. At this time, the micro-mirror unit groups before the $i^{th}$ micro-mirror unit group can all be regarded as the first micro-mirror unit groups, and the remaining reset display duration of each of the first micro-mirror unit groups at the end of the first period is obtained. The first period refers to a period of loading data for the target micro-mirror unit group. Therefore, an end time of the first period refers to the moment when the control device finishes loading target data on the target bit plane for the target micro-mirror unit group.

In addition, since the $i^{th}$ micro-mirror unit group is loading data for the first time and the micro-mirror unit groups after the $i^{th}$ micro-mirror unit group have not yet loaded with data, the micro-mirror unit group(s) after the $i^{th}$ micro-mirror unit group is(are) the second micro-mirror unit group (s). The control device can obtain the data loading duration required for each micro-mirror unit group after the $i^{th}$ micro-mirror unit group, and determine a sum of the data loading duration required for each micro-mirror unit group after the $i^{th}$ micro-mirror unit group as the total data loading duration required for the second micro-mirror unit group(s).

After obtaining the total data loading duration required for the second micro-mirror unit group and the remaining reset display duration of the first micro-mirror unit group, the control device can make a difference between the reset display duration of each bit plane and the data loading duration required for the $i^{th}$ micro-mirror unit group to obtain a plurality of second difference values, where each second difference value corresponds to a bit plane. After obtaining the plurality of second difference values, the control device compares each second difference value with the total data loading duration required for the second micro-mirror unit group, and determines a bit plane corresponding to a second difference value that is not less than the total data loading duration required for the second micro-mirror unit group as a second candidate bit plane, to obtain at least one second candidate bit plane.

After obtaining at least one second candidate bit plane, taking any second candidate bit plane A among the at least one second candidate bit plane as an example, the control device determines an absolute value of a difference between the reset display duration of the second candidate bit plane A and the remaining reset display duration of each first micro-mirror unit group, to obtain a plurality of absolute values of first differences. After that, the control device compares the absolute value of each of the first differences with the data loading duration required for the $i^{th}$ micro-mirror unit group. If the absolute value of each of the first differences is not less than the data loading duration required for the $i^{th}$ micro-mirror unit group, the second candidate bit plane A is used as a third candidate bit plane. For any candidate bit plane among the at least one second candidate bit plane, the control device can refer to the above method for processing, thereby obtaining at least one third candidate bit plane. Afterwards, the control device uses any bit plane among the at least one third candidate bit plane as the target bit plane corresponding to the $i^{th}$ micro-mirror unit group.

For example, still taking the DMD with the resolution of 1920*1080 as an example, a 64-bit data transmission bus is used, and the DDR data transmission method is used to load data for each micro-mirror unit. The micro-mirror unit array included in the DMD is divided into 4 micro-mirror unit groups. Each micro-mirror unit group in the first 3 groups has 288 rows of micro-mirror units, the loading duration is 10.8 us, the last one micro-mirror unit group has 216 rows of micro-mirror units, and the data loading duration required for each micro-mirror unit group is 8.1 us. The control device first takes the first micro-mirror unit group as the target micro-mirror unit group. Since the first micro-mirror unit group is a micro-mirror unit group that is loaded with data for the first time, the second to fourth micro-mirror unit groups have not loaded with data yet, so the second to fourth micro-mirror unit groups are all the second micro-mirror unit groups. Since the data loading duration required for each micro-mirror unit group in the first 3 micro-mirror unit groups is 10.8 us and the data loading duration for the fourth micro-mirror unit group is 8.1 us, the total data loading duration required for the second micro-mirror unit group is 29.7 us.

Assuming that the number of grayscales of the image displayed by DMD is 8 bits, there are 8 bit planes. Among them, the display duration of the first bit plane is 8 us, the reset duration is 5 us, the reset display duration of the first bit plane is 13 us, and the display duration of the second bit plane is twice the display duration of the first bit plane. Therefore, the reset display duration of the second bit plane is $(2^1*8+5)$ us, and so on, the reset display durations of the third to the eighth bit planes are respectively $(2^2*8+5)$ us, $(2^3*8+5)$ us, $(2^4*8+5)$ us, $(2^5*8+5)$ us, $(2^6*8+5)$ us, $(2^7*8+5)$ us.

After obtaining the total data loading duration required for the second micro-mirror unit group and the reset display duration of each bit plane, the control device makes a difference between the reset display duration of each bit plane and the data loading duration 10.8 us required for the first micro-mirror unit group, to obtain first difference values, respectively, 2.2 us, 10.2 us, 26.2 us, 58.2 us, 122.2 us, 250.2 us, 506.2 us, 1018.2 us, where each first difference value corresponds to a bit plane, 2.2 us corresponds to the first bit plane, 10.2 us corresponds to the second bit plane, and so on.

After obtaining the first difference value, the control device respectively compares 2.2 us, 10.2 us, 26.2 us, 58.2 us, 122.2 us, 250.2 us, 506.2 us, and 1018.2 us with the total data loading duration 29.7 us required for the second micro-mirror unit group to obtain the first difference values that are not less than 29.7 us, i.e., 58.2 us, 122.2 us, 250.2 us, 506.2 us, and 1018.2 us. In this way, it can be determined that the first candidate bit planes include the fourth to eighth bit planes. At this time, any bit plane of the fourth to eighth bit planes can be used as the target bit plane corresponding to the first micro-mirror unit group.

For other micro-mirror unit groups except the first micro-mirror unit group during the process of the first data loading, for example, assuming that the control device determines the fifth bit plane as the bit plane corresponding to the first micro-mirror unit group through the above method, a reset display duration of the bit plane is 133 us. After that, according to the order of the micro-mirror unit groups, the control device takes the second micro-mirror unit group as the target micro-mirror unit group. At this time, the $1^{st}$ micro-mirror unit group is a first micro-mirror unit group, the $3^{rd}$ to $4^{th}$ micro-mirror unit groups are second micro-mirror unit groups, and the total data loading duration required for the second micro-mirror unit groups is 18.9 us. Since the control device will load data for the second micro-mirror unit group immediately after loading data for the first micro-mirror unit group, the start time for loading data for the second micro-mirror unit group is also the reset display start time of the first micro-mirror unit group. The data loading duration required for the second micro-mirror unit group is 10.8 us. That is, after loading data for the second micro-mirror unit group, the remaining reset display duration of the first micro-mirror unit group is 133 us minus 10.8 us, which is equal to 122.2 us.

After obtaining the total data loading duration 18.9 us required for the second micro-mirror unit group, the remaining reset display duration 122.2 us of the first micro-mirror unit group, and the reset display duration of each bit plane, the control device makes a difference between the reset display duration of each bit plane and the data loading duration 10.8 us required for the second micro-mirror unit group, to obtain second difference values corresponding to 8 bit planes, respectively, 2.2 us, 10.2 us, 26.2 us, 58.2 us, 122.2 us, 250.2 us, 506.2 us, 1018.2 us, where the second difference value corresponding to the first bit plane is 2.2 us, the second difference value corresponding to the second bit plane is 10.2 us, and so on.

After obtaining the second difference value corresponding to each bit plane, the control device compares the second difference value corresponding to each bit plane with the total data loading duration of 18.9 us required for the second micro-mirror unit group, and determines the bit planes corresponding to the second difference value that is not less than the total data loading duration 18.9 us required for the second micro-mirror unit group, where the determined bit planes are the third bit plane, the fourth bit plane, the fifth bit plane, and the sixth bit plane, the seventh bit plane and the eighth bit plane, that is, the third to eighth bit planes are all second candidate bit planes. After that, the control device can determine absolute values of differences between the reset display durations, i.e., 37 us, 69 us, 133 us, 261 us, 517 us and 1029 us, of the third to eighth bit planes, and the remaining reset display duration 122.2 of the first micro-mirror unit group, to obtain a plurality of first difference absolute values, which are 85.2 us, 53.2 us, 10.8 us, 133.8 us, 394.8 us, and 906.8 us respectively. Here, 85.2 us corresponds to the third bit plane, 53.2 us corresponds to the fourth bit plane, and so on.

After obtaining the first difference absolute values corresponding to the second candidate bit planes, the control device uses the bit plane corresponding to the first difference absolute value that is not less than the data loading duration 10.8 us required for the second micro-mirror unit group as the third candidate bit plane. It can be seen from the above calculation that the third bit plane to the eighth bit plane can all be used as the third candidate bit planes. Therefore, the control device can use any bit plane of the third bit plane to the eighth bit plane as the target bit plane corresponding to the second micro-mirror unit group.

For the micro-mirror unit group(s) after the second micro-mirror unit group, the target bit plane of the corresponding micro-mirror unit group can be determined by referring to the above method of determining the target bit plane corresponding to the second micro-mirror unit group, which is not repeated in the embodiments of the disclosure here.

After loading first data for all micro-mirror unit groups in the micro-mirror unit array, the control device first determines the remaining reset display duration of the plurality of first micro-mirror unit groups at the current moment during the $n^{th}$ data loading process for each micro-mirror unit group in the micro-mirror unit array, selects the micro-mirror unit group with the shortest remaining reset display duration from the plurality of first micro-mirror unit groups as the target micro-mirror unit group to obtain the data loading duration required for the target micro-mirror unit group; based on the reset display duration of each bit plane, the data loading duration required for the target micro-mirror unit group and the remaining reset display duration of the other micro-mirror unit groups among the plurality of first micro-mirror unit groups except for the target micro-mirror unit group, the control device determines the target bit plane. Here, n is an integer greater than 1.

After the control device loads the first data to all the micro-mirror unit groups in the micro-mirror unit array, all the micro-mirror unit groups in the micro-mirror unit array are in the reset display duration, that is, at this time, all the micro-mirror unit groups in the micro-mirror unit array are the first micro-mirror unit groups. At this time, the remaining reset display duration of each first micro-mirror unit group at the current moment can be counted, and the statistically obtained remaining reset display duration of each first micro-mirror unit group at the current moment can be sorted from small to large. And the first micro-mirror unit group with the shortest remaining reset display duration is used as the target micro-mirror unit group.

After determining the target micro-mirror unit group, the control device can obtain the data loading duration required for the target micro-mirror unit group, the remaining reset display duration of the remaining micro-mirror unit groups, except for the target micro-mirror unit group, at the end of the first period among the plurality of first micro-mirror unit groups, and the reset display duration of each bit plane that has not been loaded in the target micro-mirror unit group during the period of displaying the current frame of image. After that, for any bit plane that has not been loaded in the target micro-mirror unit group, the control device can determine an absolute value of a difference between the reset display duration of the bit plane and the remaining reset display duration of each of the first micro-mirror unit groups except for the target micro-mirror unit group, to obtain a plurality of second difference absolute values corresponding to the bit plane. Comparing the plurality of second difference absolute values corresponding to the bit plane with the data loading duration required for the target micro-mirror unit group, if the plurality of second difference absolute values corresponding to the bit plane are not less than the data loading duration required for the target micro-mirror unit, the bit plane is used as a fourth candidate bit plane. For each bit plane that has not been loaded in the target micro-mirror unit group, it can refer to the above method to determine whether the corresponding bit plane can be used as the fourth candidate bit plane, thereby obtaining at least one fourth candidate bit plane. Afterwards, the control device may use any bit plane among the at least one fourth candidate bit plane as the target bit plane corresponding to the target micro-mirror unit group.

It should be noted that, for the determination method of the target bit plane during the $n^{th}$ data loading process of any micro-mirror unit group in the micro-mirror unit array, reference can be made to the above-mentioned determination method of the target bit plane corresponding to the target micro-mirror unit group, which is not repeated in the embodiments of the disclosure here.

Figure 8:
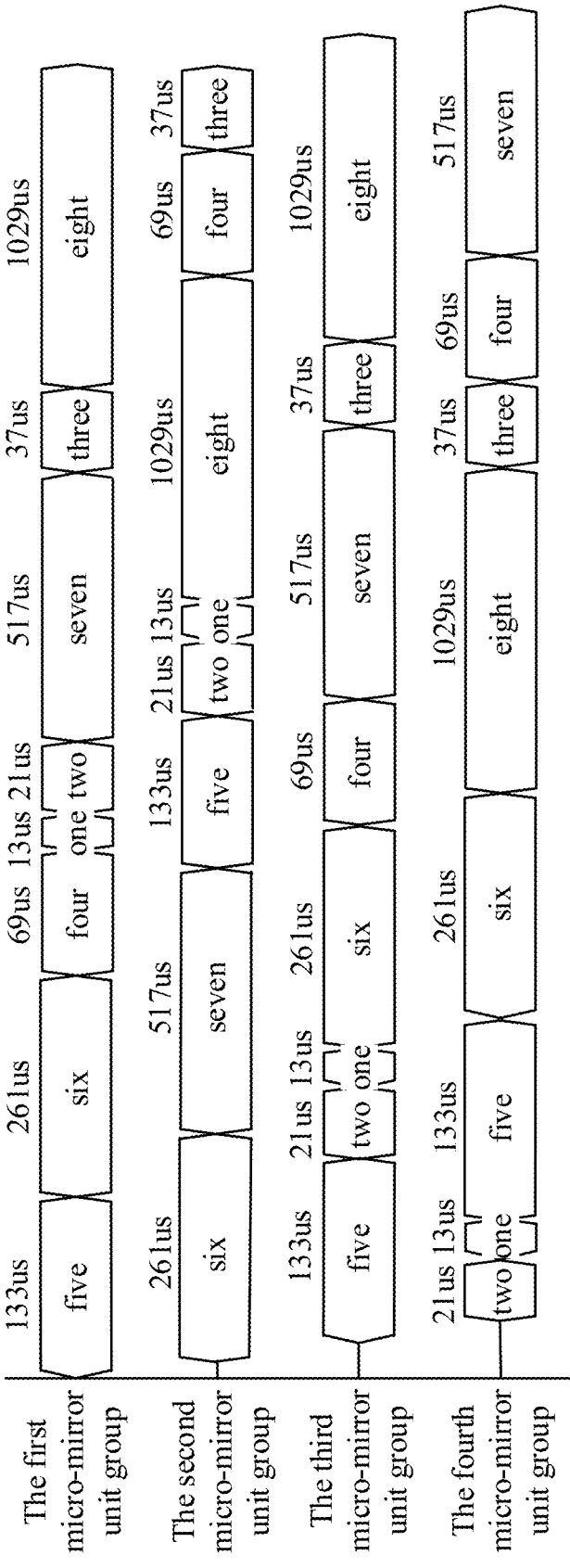
FIG. 8 is a schematic diagram of a data loading and display method according to embodiments of the disclosure.

Still taking the above example as an example, referring to FIG. 8, assuming that when data is loaded for the first time, the bit planes loaded by the first to fourth micro-mirror unit groups are respectively the fifth bit plane, the sixth bit plane, the fifth bit plane, the second bit plane. After loading all the micro-mirror unit groups, the remaining reset display duration of the first micro-mirror unit group is 103.3 us, the remaining reset display duration of the second micro-mirror unit group is 242.1 us, the remaining reset display duration of the third micro-mirror unit group is 124.9 us, and the remaining reset display duration of the fourth micro-mirror unit group is 21 us. It can be seen that at the current moment, the remaining reset display duration of the fourth micro-mirror unit group is the shortest. Therefore, the fourth micro-mirror unit group can be used as the target micro-mirror unit group.

After the control device uses the fourth micro-mirror unit group as the target micro-mirror unit group, since the fourth micro-mirror unit group has already loaded the data on the second bit plane, unloaded bit planes of the fourth micro-mirror unit group are the first bit plane, the third bit plane, the fourth bit plane, the fifth bit plane, the sixth bit plane, the seventh bit plane and the eighth bit plane. After that, an absolute value of a difference between the reset display duration of the first bit plane and the remaining reset display duration of each of the micro-mirror unit groups except for the fourth micro-mirror unit group, to obtain a plurality of second difference absolute values corresponding to the first bit plane, which are 90.3 us, 229.1 us, and 111.9 us respectively. After that, the above-mentioned plurality of second difference absolute values are compared with the data loading duration required for the fourth micro-mirror unit group. Since the plurality of second difference absolute values are not less than the value of the data loading duration required for the fourth micro-mirror unit group, the first bit plane can be used as the fourth candidate bit plane corresponding to the fourth micro-mirror unit group. According to the same method, the control device can continue to determine whether other remaining unloaded bit planes can be used as the fourth candidate bit planes. In this way, the determined fourth candidate bit planes include the first bit plane, the third bit plane, the fourth bit plane, the fifth bit plane, the sixth bit plane, the seventh bit plane, the eighth bit plane, which can be used as the target bit plane corresponding to the fourth micro-mirror unit group. At this time, the control device can use any one of the first bit plane, the third bit plane, the fourth bit plane, the fifth bit plane, the sixth bit plane, the seventh bit plane, and the eighth bit plane as the target bit plane corresponding to the fourth micro-mirror unit group.

It is assumed that the control device uses the first bit plane as the target bit plane corresponding to the fourth micro-mirror unit group, and loads the target data on the first bit plane for the fourth micro-mirror unit group. After that, the control device can continue, by referring to the above method, to find the micro-mirror unit group with the shortest remaining reset display duration, and determine the micro-mirror unit group with the shortest remaining reset display duration as the target micro-mirror unit group. Referring to the above method, it can be determined that the fourth micro-mirror unit group is still the micro-mirror unit group with the shortest remaining reset display duration. At this time, the fourth micro-mirror unit group is continued to be as the target micro-mirror unit group, and referring to the above method, the target bit plane of the fourth micro-mirror unit group is determined, and the fourth micro-mirror unit group is loaded with the target data on the target bit plane (i.e., the fifth bit plane in FIG. 8). After that, the target micro-mirror unit group is determined from the other four micro-mirror unit groups, and the target micro-mirror unit group is loaded with the target data on the target bit plane, and so on, until one frame of image display is completed.

Referring to FIG. 8, in summary, the bit planes loaded in sequence by each of the above micro-mirror unit groups are as follows:

the bit planes loaded in sequence by the first micro-mirror unit group are: 5, 6, 4, 1, 2, 7, 3, 8;

the bit planes loaded in sequence by the second micro-mirror unit group are: 6, 7, 5, 2, 1, 8, 4, 3;

the bit planes loaded in sequence by the third micro-mirror unit group are: 5, 2, 1, 6, 4, 7, 3, 8;

the bit planes loaded in sequence by the fourth micro-mirror unit group are: 2, 1, 5, 6, 8, 3, 4, 7.

Step 202: Based on a binary grayscale value of each micro-mirror unit of the target micro-mirror unit group, loading target data on the target bit plane to the target micro-mirror unit group, so that the target micro-mirror unit group displays based on the target data.

In the embodiments of the disclosure, the control device can convert a grayscale value of each pixel in a to-be-displayed image of the micro-mirror unit array into a binary grayscale value. After that, the binary grayscale value of each pixel is used as the binary grayscale value of the micro-mirror unit corresponding to the corresponding pixel. Here, each bit of the binary grayscale value corresponds to a bit plane, and a binary number on each bit is bit data on the corresponding bit plane.

For example, any micro-mirror unit is taken as an example. Assuming that a binary grayscale value of the micro-mirror unit is 10101010, then bits 0 to 7 of the binary grayscale value 10101010 each correspond to a bit plane, and the binary number 0 on the $0^{th}$ bit is bit data on the corresponding bit plane, the binary number 1 on the first bit can be used as bit data on the corresponding bit plane, and so on, the binary number 1 on the $7^{th}$ bit can be used as bit data on the corresponding bit plane.

Based on this, after determining the target bit plane corresponding to the target micro-mirror unit group, the control device can obtain the bit data corresponding to the target bit plane in the binary grayscale value of each micro-mirror unit in the target micro-mirror unit group, use the obtained bit data as the target data on the target bit plane corresponding to the corresponding micro-mirror unit, and send the corresponding target data to the corresponding micro-mirror unit. Correspondingly, each micro-mirror unit in the target micro-mirror unit group receives the target data sent from the control device, stores the target data in CMOS of the corresponding micro-mirror unit, and then makes the micro-mirror unit itself in an "on" state or an "off" state based on the data stored in the CMOS. In addition, the control device can also determine the next time to send the corresponding target data to each micro-mirror unit in the target micro-mirror unit group according to the target bit plane, so as to achieve the control of the reset display duration of each micro-mirror unit in the target micro-mirror unit group.

It can be seen from the data loading process introduced above that, in the embodiments of the disclosure, when loading data for the first time for each micro-mirror unit group in the micro-mirror unit array, the control device determines, according to an order of each of the micro-mirror unit groups, the reset display duration of the corresponding target bit plane for each of the micro-mirror unit groups in sequence, where the reset display duration is not less than the total data loading duration required for the second micro-mirror unit group that has not loaded with data. In this way, for any micro-mirror unit group, the first period of loading the target data on the target bit plane for the micro-mirror unit group will be within a reset display duration allowed for the previous first micro-mirror unit group, and it can be ensured that before the first data is loaded to the last micro-mirror unit group, the micro-mirror unit groups that have loaded with data are all within the reset display duration, so that there is no situation shown that a micro-mirror unit group has finished displaying or a micro-mirror unit group is about to end displaying and needs to load with data for the second time. Here, a time length of the reset display duration allowed for the first micro-mirror unit group is the sum of the reset duration of the corresponding micro-mirror unit group and the display duration of the bit plane currently being displayed.

In addition, when determining the target bit plane corresponding to the target micro-mirror unit group, the absolute value of the difference between the reset display duration of the target bit plane and the remaining reset display duration of the first micro-mirror unit group at the end of the first period is compared with the data loading duration required for the target micro-mirror unit group, so that the determined reset display duration of the target bit plane is not less than the remaining reset display duration of the first micro-mirror unit group at the end of the first period, so that the absolute value of the difference between the remaining reset display durations of any two micro-mirror unit groups is not less than the data loading duration required for the corresponding micro-mirror unit group, ensuring that any two micro-mirror unit groups in the micro-mirror unit array does not need to be loaded with data at the same time, that is, there will be no data loading conflicts.

In the embodiments of the disclosure, the first period for loading the target data for the target micro-mirror unit group is within the reset display duration allowed for the first micro-mirror unit group. That is, for any micro-mirror unit group, the reset display duration allowed for other micro-mirror unit groups that are displaying data can be used to load data, thereby reducing the time occupied by data loading during the image display process, thereby shortening the time required for image display and increasing the frame rate of image display. In addition, in the embodiments of the disclosure, at the end of the first period, the remaining reset display duration of each micro-mirror unit group in the plurality of micro-mirror unit groups is not less than the data loading duration required for the corresponding micro-mirror unit group; after the control device loads the target data for the target micro-mirror unit group, the remaining reset display duration of other micro-mirror unit groups is still enough to load data, and because the absolute value of the difference between the remaining reset display durations of any two micro-mirror unit groups among the plurality of micro-mirror unit groups is not less than the data loading duration required for the corresponding micro-mirror unit group. Therefore, it is ensured that any two micro-mirror unit groups in the micro-mirror unit array will not need to perform data loading at the same time, that is, there will be no data loading conflicts, thus ensuring the quality of image display.

Still referring to the architecture diagram of the display system shown in FIG. 1, the control device 400 can also obtain a micro-mirror stabilization duration and a data zeroing duration of the micro-mirror unit array included in the DMD 201. After obtaining the micro-mirror stabilization duration and the data zeroing duration, when determining the display duration of each bit plane, a first basic display duration is determined based on the micro-mirror stabilization duration and the data zeroing duration, and based on the first basic display duration, the display duration of each bit plane in the plurality of bit planes of the to-be-displayed image is determined. After that, the displaying the data of the to-be-displayed image in each micro-mirror unit of the target micro-mirror unit group based on the display duration of each of the bit planes, includes: displaying data on the plurality of bit planes in the to-be-displayed image based on the display duration of each of the bit planes, a data loading duration and the micro-mirror stabilization duration, so that the display duration of the to-be-displayed image is less than a reference duration, data on a part of the plurality of bit planes are loaded after performing the data zeroing operation on the data loaded in the micro-mirror unit array, the data loading duration is greater than the data zeroing duration, the reference duration refers to a display duration for displaying one frame of image based on a reference basic display duration, and the reference basic display duration is greater than the first basic display duration.

For example, after determining the first basic display duration, the control device 400 may use the first basic display duration as the display duration of the lowest bit plane of the to-be-displayed image. For each of the bit planes except the lowest bit plane, the display duration of the bit plane is twice the display duration of the lower bit plane adjacent to this bit plane. In this way, the control device 40 can determine the display duration of other bit planes based on the display duration of the lowest bit plane. In addition, the control device 400 can also determine to-be-loaded data of each micro-mirror unit corresponding to each bit plane according to the binary grayscale value of the to-be-displayed image. Afterwards, when any bit plane is displayed, the control device 400 can load the to-be-loaded data of each micro-mirror unit corresponding to the bit plane into CMOS of each micro-mirror unit. After that, the control device 400 simultaneously controls each micro-mirror unit to be in a light-on state or a light-off state based on the data stored in its own CMOS, and controls the micro-mirror unit in the micro-mirror unit array to be in a light-on state or a light-off state based on the display duration of the bit plane, to achieve image display.

Figure 9:
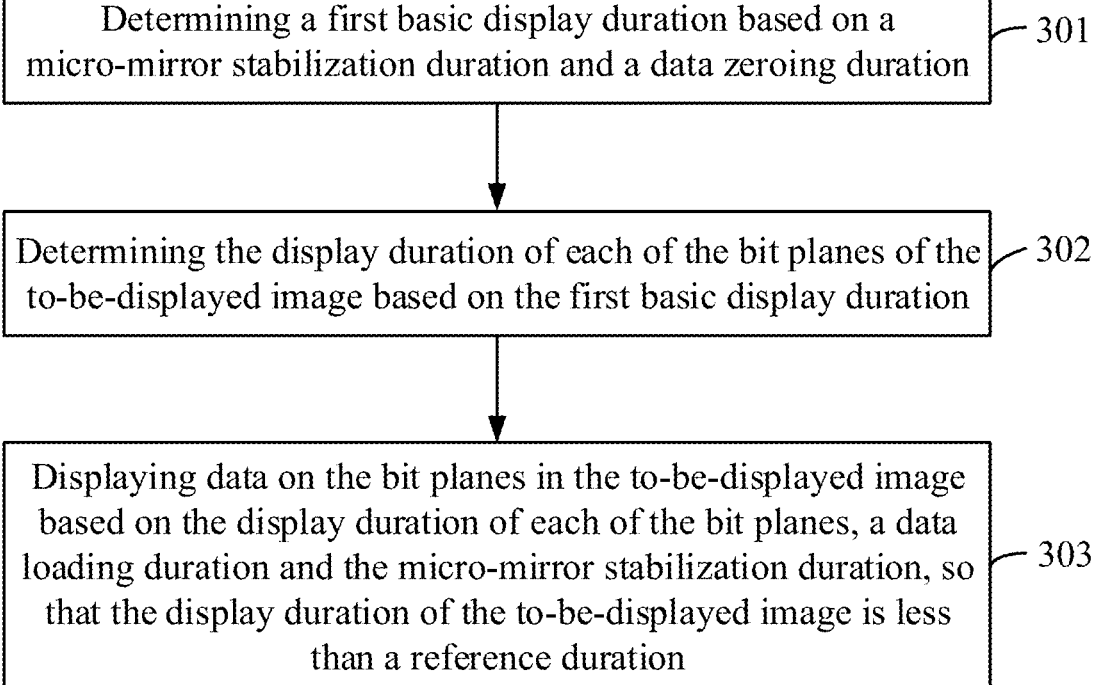
FIG. 9 is a flow chart of an image display method according to embodiments of the disclosure.

FIG. 9 shows another image display method according to embodiments of the disclosure. This method can be applied to the control device introduced in the above embodiments. As shown in FIG. 9, the method includes the following steps.

Step 301: Determining a first basic display duration based on a micro-mirror stabilization duration and a data zeroing duration.

In the embodiments of the disclosure, after a micro-mirror (s) in the micro-mirror unit is reset, a yoke plate in the micro-mirror will contact a first landing platform or a second landing platform. After the yoke plate contacts the first landing platform or the second landing platform, the micro-mirror needs a stabilization process. During the stabilization process of the micro-mirror, the control device still cannot load data into CMOS1 included in the micro-mirror unit. In the embodiments of the disclosure, the duration used by the stabilization process of the micro-mirror is called a micro-mirror stabilization duration. The control device can determine the micro-mirror stabilization duration according to the model of the DMD. For example, for a DMD with a resolution of 1920*1080, the micro-mirror stabilization duration is 8 us.

In addition, the data zeroing duration refers to a duration required for performing a data zeroing operation on data loaded in each micro-mirror unit in the micro-mirror unit array. Here, the data zeroing duration is related to the number of micro-mirror units included in the DMD. The more the number of micro-mirror units included in the DMD is, the longer the data zeroing duration is. For example, for a DMD with a resolution of 1920*1080, the data zeroing duration is 0.5625 us.

For example, after obtaining the data zeroing duration, the control device can first determine whether the data zeroing duration satisfies the following formula (1). If it satisfies, the first basic display duration is determined based on the micro-mirror stabilization duration and the data zeroing duration.

$$t_c < \frac{\left(\sum_{k=1}^{n-1} 2^k\right)t_1 - mt_r + m(t_s + t_1)}{\sum_{k=1}^{n-1} 2^k} \quad (1)$$

Wherein, $t_c$ is the data zeroing duration, n is the number of the plurality of bit planes, k is used to indicate a $k^{th}$ bit plane among the n bit planes, $t_1$ is the data loading duration, $t_r$ is a reset duration required for a reset operation, $t_s$ is the micro-mirror stabilization duration, and m is the number of bit planes whose display duration is less than a sum of the micro-mirror stabilization duration and the data loading duration, among the n bit planes.

In one implementation, after the control device determines that the data zeroing duration meets the above conditions, the sum of the micro-mirror stabilization duration and the data zeroing duration can be used as the first basic display duration.

For example, for a DMD with a resolution of 1920*1080, the micro-mirror stabilization duration is 8 us, and the data zeroing duration is 0.5625 us. If the above formula (1) is satisfied, the first basic display duration is 8.5625 us.

Optionally, the control device may also set a value greater than the sum of the micro-mirror stabilization duration and the data zeroing duration as the first basic display duration. In this case, the difference between the first basic display duration and the micro-mirror stabilization duration, that is, the first difference value, satisfies the condition shown in the following formula (2).

$$T < \frac{\left(\sum_{k=1}^{n-1} 2^k\right)t_1 - mt_r + m(t_s + t_1)}{\sum_{k=1}^{n-1} 2^k} \quad (2)$$

Wherein, T is a first difference value, n is the number of the plurality of bit planes, k is used to indicate a $k^{th}$ bit plane among the n bit planes, $t_1$ is the data loading duration, $t_r$ is a reset duration required for a reset operation, $t_s$ is the micro-mirror stabilization duration, and m is the number of bit planes whose display duration is less than a sum of the micro-mirror stabilization duration and the data loading duration, among the n bit planes.

Step 302: Determining the display duration of each of the plurality of bit planes of the to-be-displayed image based on the first basic display duration.

The control device may also determine the plurality of bit planes according to the grayscale level of the to-be-displayed image of the micro-mirror unit array, where the number of the plurality of bit planes is equal to the grayscale level.

For example, assuming that the grayscale level of the to-be-displayed image of the micro-mirror unit array is 8 bits, it means that the grayscale value of each pixel in the to-be-displayed image of the micro-mirror unit array can be represented by an 8-bit binary number, in this case, it is determined that the to-be-displayed image corresponds to 8 bit planes. At this time, the first bit data in the binary grayscale value of each pixel of the image in an order from low to high forms the first bit plane, and the second bit data forms the second bit plane, and so on.

In one implementation, the control device may use the first basic display duration as the display duration of the first bit plane of the to-be-displayed image, and for each of the other bit planes except the first bit plane, the display duration of the bit plane is twice the display duration of the previous bit plane adjacent to this bit plane. Based on this, after obtaining the display duration of the first bit plane, the control device can determine the display duration of each of the other bit planes based on the display duration of the first bit plane.

For example, assuming that the first basic display duration is 8.5625 us, the display duration of the first bit plane can be set to 8.5625 us. At this time, the display duration of the second bit plane is twice the display duration of the first bit plane, which is 17.125 us, and so on, the display durations of the third bit plane to the eighth bit plane are 34.25 us, 68.5 us, 137 us, 274 us, 548 us, and 1096 us, respectively.

Step 303: Displaying data on the plurality of bit planes in the to-be-displayed image based on the display duration of each of the bit planes, the data loading duration and the micro-mirror stabilization duration, so that the display duration of the to-be-displayed image is less than a reference duration.

Here, the data loading duration refers to the time length required for loading data for the micro-mirror unit array.

For example, the control device can determine the total number of micro-mirror units included in the micro-mirror unit array based on the resolution of the DMD, and determine the number of micro-mirror units that can be loaded in one clock cycle based on a data transmission bus bit width and the clock cycle. Afterwards, based on the total number of micro-mirror units included in the micro-mirror unit array and the number of micro-mirror units that can be loaded in one clock cycle, the number of clock cycles required to load data for each micro-mirror unit in the micro-mirror unit array is determined. Then, based on the duration of one clock cycle, the data loading duration required to load data for each micro-mirror unit in the micro-mirror unit array is calculated.

For example, for a DMD with a resolution of 1920*1080, the total number of micro-mirror units included in the DMD is 1080*1920, a 64-bit data transmission bus is used, and a Double Data Rate (DDR) data transmission method is used. Data can be transmitted twice in one clock cycle, that is, 128 bits of data can be transmitted in one clock cycle, so that one clock cycle can load data for 128 micro-mirror units. The clock cycle required to load data for 1080*1920 micro-mirror units is 16200, and the duration of one clock cycle is 2.5 ns. Therefore, the data loading duration required to load data for 1080*1920 micro-mirror units is 40.5 us.

After obtaining the display duration of each bit plane in the to-be-displayed image, the data loading duration and the micro-mirror stabilization duration, the control device can use the sum of the data loading duration and the micro-mirror stabilization duration as a target duration, and then load the data on the corresponding bit plane for the micro-mirror unit array based on the target duration and the display duration of each bit plane. Wherein, the data on a part of the plurality of bit planes in the to-be-displayed image is loaded after performing a data zeroing operation on the data of the previously displayed bit plane loaded in the micro-mirror unit array. The above-mentioned part of the bit planes refer to bit planes whose display duration is less than the target duration.

Next, the process is introduced by taking an example of loading data on any bit plane among the plurality of bit planes. For convenience of description, this bit plane is called the first bit plane.

Exemplarily, the control device can compare the display duration of the first bit plane, that is, the first display duration, with the target duration. If the first display duration is less than the target duration, it means that the loading of the second data for each micro-mirror unit in the micro-mirror unit array cannot be completed in the first display duration, thus, in the process of the micro-mirror unit array displaying the first data on the first bit plane, the data zeroing operation can be performed on the micro-mirror unit array, and after the display of the first data is completed, a reset operation is performed on the micro-mirror unit array, so that the micro-mirror unit array is in a light-off state. As can be seen from the above introduction, when the micro-mirror unit array is in a light-off state, each micro-mirror unit in the micro-mirror unit array can reflect an incident light beam to a light absorber, so that the light beam emitted from a light source is absorbed by the light absorber. Because in the light-off state, the light beam emitted from the light source will not reach the lens, such as a projection lens, and thus will not affect the pixel value of the displayed image. Therefore, in a case that the micro-mirror unit array is in the light-off state, the micro-mirror unit array can be loaded with the second data on the second bit plane, and the micro-mirror unit array is controlled to display the second data. Here, the second bit plane is the next bit plane to be displayed after the first bit plane is displayed.

Exemplarily, after determining that the first display duration of the first bit plane is less than the target duration, the control device can set data in CMOS1 in each micro-mirror unit included in the micro-mirror unit array to 0 through a data zeroing instruction during the process of displaying the first data by the micro-mirror unit included in the micro-mirror unit array. Correspondingly, data 1 is automatically loaded into CMOS2 below the micro-mirror unit. After setting the data in CMOS1 of each micro-mirror unit to 0, the control device may load a reset voltage to a micro-mirror (s) in each micro-mirror unit after the display duration of the first data by the micro-mirror unit array reaches the first display duration, to release the micro-mirror(s). After the micro-mirror is released, a bias voltage is loaded to the micro-mirror of each micro-mirror unit, and each micro-mirror unit is controlled to deflect based on the 0 loaded in CMOS1 and the bias voltage loaded on the micro-mirror.

That is, the micro-mirror in each micro-mirror unit is controlled to deflect in a direction close to a first addressing electrode until each micro-mirror unit is in a light-off state. After the duration during which each micro-mirror unit is in the light-off state is equal to the micro-mirror stabilization duration, that is, after the micro-mirror in each micro-mirror unit is stable, the second data is loaded into CMOS1 of each micro-mirror unit included in the micro-mirror unit array. After loading the second data for each micro-mirror unit in the micro-mirror unit array, the control device loads the reset voltage to the micro-mirror of each micro-mirror unit again, causing the micro-mirror of each micro-mirror unit to be released again. After the micro-mirror of each micro-mirror unit is released, a bias voltage is loaded to the micro-mirror of each micro-mirror unit again, so that the micro-mirror of each micro-mirror unit can be deflected again based on the second data loaded in CMOS1 and the bias voltage loaded on the micro-mirror, to display the second data loaded in CMOS1.

Exemplarily, the control device compares the display duration of the first bit plane, that is, the first display duration, with the target duration. If the first display duration is not less than the target duration, it means that the loading of the second data by the control device for each micro-mirror unit in the micro-mirror unit array can be completed in the first display duration, at this time, the control device can load the second data for the micro-mirror unit array during the process of the micro-mirror unit array displaying the first data; after the display of the first data is completed, the micro-mirror unit array is controlled to display the second data.

Exemplarily, after determining that the first display duration on the first bit plane is not less than the target duration, the control device can calculate a difference between the first display duration and the micro-mirror stabilization duration to obtain a second difference value. If the second difference value is equal to the data loading duration, then the second data is immediately loaded to the micro-mirror unit in the micro-mirror unit array after the micro-mirror is stable. If the first difference value is greater than the data loading duration, then the second data can be loaded to the micro-mirror unit in the micro-mirror unit array after the micro-mirror is stable and at any time when the remaining display duration is not less than the data loading duration. After loading the second data to each micro-mirror unit included in the micro-mirror unit array, the control device can determine whether the display duration of the first data reaches the first display duration. If the display duration of the first data reaches the first display duration, it is determined that the display of the first data is completed. After determining that the display of the first data is completed, a reset voltage is immediately applied to the micro-mirror(s) of each micro-mirror unit to release the micro-mirror(s) of each micro-mirror unit. After the micro-mirror(s) of each micro-mirror unit is(are) released, the micro-mirror(s) of each micro-mirror unit is(are) immediately loaded with a bias voltage, so that the micro-mirror(s) of each micro-mirror unit display the second data based on the loaded second data and the bias voltage.

For each bit plane in the to-be-displayed image, the control device can display the data on each bit plane in sequence by referring to the above method. It should be noted that the display order of each bit plane may be the same as or may be different from the high and low order of the bits of the binary grayscale value corresponding to each bit plane.

Next, the implementation process of another image display method according to the embodiments of the disclosure will be described through a specific example.

Figure 10:
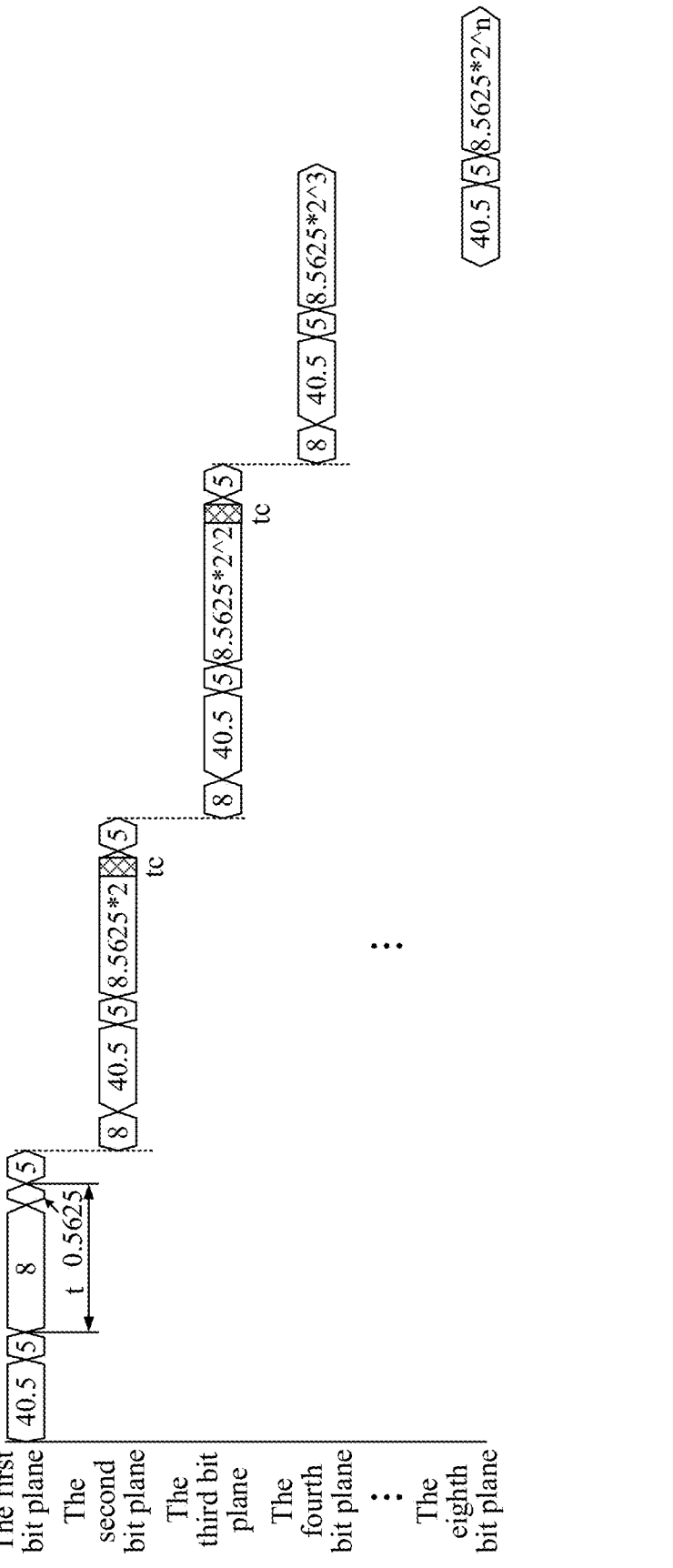
FIG. 10 is a schematic diagram of a data loading method according to embodiments of the disclosure.

Referring to FIG. 10, for example, assuming that a resolution of a DMD is 1920*1080, the micro-mirror stabilization duration is 8 us, the data zeroing duration is 0.5625 us, and the data loading duration is 40.5 us. If the grayscale level of the to-be-displayed image is 8 bit, there are 8 bit planes. The sum of the micro-mirror stabilization duration and the data zeroing duration is used as the first basic display duration, that is, the first basic display duration is 8.5625 us. On this basis, the display durations of the first bit plane to the eighth bit plane are 8.5625 us, 17.125 us, 34.25 us, 68.5 us, 137 us, 274 us, 548 us, and 1096 us respectively. In the process of displaying the to-be-displayed image, the control device first loads the data on the first bit plane to each micro-mirror unit in the micro-mirror unit array. The required data loading duration is 40.5 us. After loading the data on the first bit plane for each micro-mirror unit, the each micro-mirror unit is controlled by the control device to start deflecting based on the data stored in its own CMOS1 and the bias voltage applied on the micro-mirror. The duration required for deflecting to the light-on state or the light-off state is micro-mirror reset duration, assuming that the micro-mirror reset duration is 5 us. After that, the data on the first bit plane is displayed, and the display duration is 8.5625 us. Since the display duration 8.5625 us of the first bit plane is less than the sum 48.5 us of the micro-mirror stabilization duration and the data loading duration, after the micro-mirror stabilizes for 8 us, the control device starts to perform the zeroing operation, that is, the data on the first bit plane stored in CMOS1 of each micro-mirror unit is set to 0. After the data in CMOS1 of the micro-mirror of each micro-mirror unit is set to 0, a reset operation is performed on each micro-mirror unit, and the reset duration is 5 us. After that, each micro-mirror unit is controlled to be in the light-off state based on the 0 loaded in CMOS1 and the bias voltage. In a case that the micro-mirror unit is in the light-off state and stabilizes for 8 us, the data on the second bit plane is loaded into CMOS1 of each micro-mirror unit. After each micro-mirror unit has loaded with the data on the second bit plane, each micro-mirror unit is again controlled to reset. After that, the data on the second bit plane is displayed, and the display duration is 17.125 us.

Since the display duration 17.125 us of the second bit plane of is still less than the sum 48.5 us of the micro-mirror stabilization duration and the data loading duration, it is still necessary to perform a zeroing operation during the display of the data on the second bit plane, and when the micro-mirror is in the light-off state, the data on the third bit plane is loaded to each micro-mirror unit, and then the micro-mirror is reset and the data on the third bit plane is displayed. Since the display duration 34.25 us of the third bit plane is still less than the sum of the micro-mirror stabilization duration and the data loading duration, the above process needs to be repeated to load and display the data on the fourth bit plane. Since the display duration of the fourth bit plane is 68.5 us, which is greater than the sum 48.5 us of the micro-mirror stabilization duration and the data loading duration, thus the control device can load the data on the fifth bit plane for each micro-mirror when the micro-mirror unit array displays the data on the fourth bit plane. Since the display durations of the fifth to eighth bit planes are greater than the sum of the micro-mirror stabilization duration and the data loading duration, the data of the next bit plane can be loaded while the data on the current bit plane is displayed, until the display of one frame of image is completed.

From the above display process, it can be calculated that the display duration required for displaying one frame of image is equal to 2383.9375 us. Therefore, the maximum display frame rate of the image can reach 419 Hz, which can meet the display requirements of high-frequency images.

In the embodiments of the disclosure, the first basic display duration is determined based on the micro-mirror stabilization duration and the data zeroing duration, and then the image is displayed based on the first basic display duration. Here, for the data on some bit planes in the image, the data loaded in the micro-mirror unit array can be reset to zero before loading and displaying, so as to ensure the display of the data on each bit plane. Since the data zeroing duration is less than the data loading duration, the first basic display duration determined based on the micro-mirror stabilization duration and the data zeroing duration is smaller than the reference basic display duration determined based on the micro-mirror stabilization duration and the data loading duration. The display duration of one frame of image is determined by the basic display duration. In this way, it can be ensured that the display duration of one frame of image based on the first basic display duration is smaller than the display duration of one frame of image based on the reference basic display duration, thereby improving the frame rate of image display.

For convenience of explanation, the above description has been made in conjunction with specific embodiments. However, the above illustrative discussion is not intended to be exhaustive or to limit the embodiments to the specific forms disclosed. Various modifications and variations are possible in light of the above teachings. The above embodiments are selected and described to better explain the principles and practical applications, so that those skilled in the art can better use the embodiments and various modified embodiments suitable for specific use considerations.

What is claimed is:

1. An image display method, comprising:
determining bit planes corresponding to a target micro-mirror unit group in a micro-mirror unit array, and determining a display duration of each of the bit planes, wherein the micro-mirror unit array comprises a plurality of micro-mirror unit groups, and each of the micro-mirror unit groups comprises a plurality of rows of micro-mirror units, the target micro-mirror unit group is a micro-mirror unit group currently to be loaded with data among the plurality of micro-mirror unit groups;
displaying data of a to-be-displayed image in each micro-mirror unit of the target micro-mirror unit group based on the display duration of each of the bit planes;
wherein a first period for loading the data of the to-be-displayed image for the target micro-mirror unit group is within a reset display duration allowed for a first micro-mirror unit group, and the first micro-mirror unit group is a micro-mirror unit group that is currently displaying data among the plurality of micro-mirror unit groups;
wherein the determining the bit planes corresponding to the target micro-mirror unit group in the micro-mirror unit array, comprises:
determining a target bit plane corresponding to the target micro-mirror unit group in the micro-mirror unit array;
after determining the target bit plane corresponding to the target micro-mirror unit group in the micro-mirror unit array, the method further comprises:
based on a binary grayscale value of each micro-mirror unit of the target micro-mirror unit group, loading target data on the target bit plane to the target micro-mirror unit group, so that the target micro-mirror unit group displays based on the target data;

wherein at the end of the first period, a remaining reset display duration of each of the plurality of micro-mirror unit groups is not less than a data loading duration required for a corresponding micro-mirror unit group, and an absolute value of a difference between remaining reset display durations of any two micro-mirror unit groups among the plurality of micro-mirror unit groups is not less than the data loading duration required for the corresponding micro-mirror unit group.

2. The method according to claim 1, wherein the determining the target bit plane corresponding to the target micro-mirror unit group in the micro-mirror unit array, comprises:

obtaining a data loading duration required for each of the plurality of micro-mirror unit groups;

determining a reset display duration of each of a plurality of bit planes, wherein the plurality of bit planes are determined based on a gray level of an image displayed by the micro-mirror unit array, the plurality of bit planes comprise the target bit plane;

based on the data loading duration required for each micro-mirror unit group and the reset display duration of each bit plane, determining the target bit plane corresponding to the target micro-mirror unit group.

3. The method according to claim 2, wherein based on the data loading duration required for each micro-mirror unit group and the reset display duration of each bit plane, determining the target bit plane corresponding to the target micro-mirror unit group, comprises:

during a first data loading process for each micro-mirror unit group in the micro-mirror unit array, determining the target micro-mirror unit group based on a position sequence of the plurality of micro-mirror unit groups;

based on the data loading duration required for each micro-mirror unit group, determining a total data loading duration required for a second micro-mirror unit group among the plurality of micro-mirror unit groups, wherein the second micro-mirror unit group is not loaded with data;

determining a remaining reset display duration of the first micro-mirror unit group at the end of the first period;

determining the target bit plane based on the total data loading duration required for the second micro-mirror unit group, the remaining reset display duration of the first micro-mirror unit group, and the reset display duration of each bit plane.

4. The method according to claim 2, wherein based on the data loading duration required for each micro-mirror unit group and the reset display duration of each bit plane, determining the target bit plane corresponding to the target micro-mirror unit group, comprises:

during a nth data loading process for each micro-mirror unit group in the micro-mirror unit array, determining remaining reset display durations of a plurality of first micro-mirror unit groups at a current moment, wherein n is greater than 1 and not greater than the gray level of the image displayed by the micro-mirror unit array;

selecting a micro-mirror unit group with a shortest remaining reset display duration from the plurality of first micro-mirror unit groups as the target micro-mirror unit group;

obtaining the data loading duration required for the target micro-mirror unit group;

determining the target bit plane based on the reset display duration of each bit plane, the data loading duration required for the target micro-mirror unit group and remaining reset display durations of remaining micro-mirror unit groups in the plurality of first micro-mirror unit groups except for the target micro-mirror unit group.

5. The method according to claim 2, wherein the obtaining the data loading duration required for each of the plurality of micro-mirror unit groups, comprises:

determining a data loading duration required for one row of micro-mirror units based on a resolution of the image displayed by the micro-mirror unit array, a data transmission bus bit width and a clock cycle;

determining the data loading duration required for each micro-mirror unit group based on the data loading duration required for the one row of micro-mirror units.

6. The method according to claim 1, each of the plurality of micro-mirror unit groups comprises at least one sub-array, and each sub-array comprises a plurality of rows of micro-mirror units.

7. The method according to claim 1, wherein the determining the display duration of each of the bit planes, comprises:

determining a first basic display duration based on a micro-mirror stabilization duration and a data zeroing duration, wherein the data zeroing duration refers to a duration required to perform a data zeroing operation on data loaded in the micro-mirror unit array;

determining the display duration of each of the bit planes of the to-be-displayed image based on the first basic display duration;

the displaying the data of the to-be-displayed image in each micro-mirror unit of the target micro-mirror unit group based on the display duration of each of the bit planes, comprises:

displaying data on the bit planes in the to-be-displayed image based on the display duration of each of the bit planes, a data loading duration and the micro-mirror stabilization duration, so that the display duration of the to-be-displayed image is less than a reference duration, data on a part of the bit planes are loaded after performing the data zeroing operation on the data loaded in the micro-mirror unit array, the data loading duration is greater than the data zeroing duration, the reference duration refers to a display duration for displaying one frame of image based on a reference basic display duration, and the reference basic display duration is greater than the first basic display duration.

8. The method according to claim 7, wherein the displaying data on the bit planes in the to-be-displayed image based on the display duration of each of the bit planes, the data loading duration and the micro-mirror stabilization duration, comprises:

determining a sum of the data loading duration and the micro-mirror stabilization duration to obtain a target duration;

based on that a first display duration of a first bit plane is less than the target duration, performing the data zeroing operation on the micro-mirror unit array during displaying of first data by the micro-mirror unit array on the first bit plane, and after the displaying of the first data is completed, performing a reset operation on the micro-mirror unit array, so that the micro-mirror unit array is in a light-off state, and the first bit plane is any bit plane of the bit planes; and, in a case that the micro-mirror unit array is in the light-off state, loading a second data on a second bit plane to the micro-mirror unit array, and controlling the micro-mirror unit array to display the second data, wherein the second bit plane is a next bit plane displayed after the first bit plane is displayed;

based on that the first display duration is not less than the target duration, loading the second data to the micro-mirror unit array during displaying of the first data by the micro-mirror unit array; after the displaying of the first data is completed, controlling the micro-mirror unit array to display the second data.

9. The method according to claim 7, wherein the determining the first basic display duration based on the micro-mirror stabilization duration and the data zeroing duration, comprises:

determining a sum of the micro-mirror stabilization duration and the data zeroing duration as the first basic display duration.

10. The method according to claim 7, wherein $$t_c < \frac{\left(\sum_{k=1}^{n-1} 2^k\right)t_1 - mt_r + m(t_s + t_1)}{\sum_{k=1}^{n-1} 2^k}$$

wherein, $t_c$ is the data zeroing duration, n is a quantity of the bit planes, k is used to indicate a kth bit plane among the n bit planes, $t_1$ is the data loading duration, $t_r$ is a reset duration required for a reset operation, $t_s$ is the micro-mirror stabilization duration, and m is a quantity of bit planes whose display duration is less than a sum of the micro-mirror stabilization duration and the data loading duration, among the n bit planes.

11. An image display apparatus, comprising: a processor; a memory storing executable instructions by the processor; wherein the processor executes the executable instructions in the memory to perform:

determining bit planes corresponding to a target micro-mirror unit group in a micro-mirror unit array, and determining a display duration of each of the bit planes, wherein the micro-mirror unit array comprises a plurality of micro-mirror unit groups, and each of the micro-mirror unit groups comprises a plurality of rows of micro-mirror units, the target micro-mirror unit group is a micro-mirror unit group currently to be loaded with data among the plurality of micro-mirror unit groups;

displaying data of a to-be-displayed image in each micro-mirror unit of the target micro-mirror unit group based on the display duration of each of the bit planes;

wherein a first period for loading the data of the to-be-displayed image for the target micro-mirror unit group is within a reset display duration allowed for a first micro-mirror unit group, and the first micro-mirror unit group is a micro-mirror unit group that is currently displaying data among the plurality of micro-mirror unit groups;

wherein the processor further executes the executable instructions in the memory to perform:

determining a target bit plane corresponding to the target micro-mirror unit group in the micro-mirror unit array;

after determining the target bit plane corresponding to the target micro-mirror unit group in the micro-mirror unit array, the processor further executes the executable instructions in the memory to perform:

based on a binary grayscale value of each micro-mirror unit of the target micro-mirror unit group, loading target data on the target bit plane to the target micro-mirror unit group, so that the target micro-mirror unit group displays based on the target data;

wherein at the end of the first period, a remaining reset display duration of each of the plurality of micro-mirror unit groups is not less than a data loading duration required for a corresponding micro-mirror unit group, and an absolute value of a difference between remaining reset display durations of any two micro-mirror unit groups among the plurality of micro-mirror unit groups is not less than the data loading duration required for the corresponding micro-mirror unit group.

12. The image display apparatus according to claim 11, wherein the processor further executes the executable instructions in the memory to perform:

obtaining a data loading duration required for each of the plurality of micro-mirror unit groups;

determining a reset display duration of each of a plurality of bit planes, wherein the plurality of bit planes are determined based on a gray level of an image displayed by the micro-mirror unit array, the plurality of bit planes comprise the target bit plane;

based on the data loading duration required for each micro-mirror unit group and the reset display duration of each bit plane, determining the target bit plane corresponding to the target micro-mirror unit group.

13. The image display apparatus according to claim 12, wherein the processor further executes the executable instructions in the memory to perform:

during a first data loading process for each micro-mirror unit group in the micro-mirror unit array, determining the target micro-mirror unit group based on a position sequence of the plurality of micro-mirror unit groups;

based on the data loading duration required for each micro-mirror unit group, determining a total data loading duration required for a second micro-mirror unit group among the plurality of micro-mirror unit groups, wherein the second micro-mirror unit group is not loaded with data;

determining a remaining reset display duration of the first micro-mirror unit group at the end of the first period;

determining the target bit plane based on the total data loading duration required for the second micro-mirror unit group, the remaining reset display duration of the first micro-mirror unit group, and the reset display duration of each bit plane.

14. A laser projection apparatus, comprising a light source, an optical engine, a lens and a control device, wherein the optical engine comprises a digital micro-mirror device (DMD), and the control device is configured to control the DMD to perform:

determining bit planes corresponding to a target micro-mirror unit group in a micro-mirror unit array, and determining a display duration of each of the bit planes, wherein the micro-mirror unit array comprises a plurality of micro-mirror unit groups, and each of the micro-mirror unit groups comprises a plurality of rows of micro-mirror units, the target micro-mirror unit group is a micro-mirror unit group currently to be loaded with data among the plurality of micro-mirror unit groups;

displaying data of a to-be-displayed image in each micro-mirror unit of the target micro-mirror unit group based on the display duration of each of the bit planes;

wherein a first period for loading the data of the to-be-displayed image for the target micro-mirror unit group is within a reset display duration allowed for a first micro-mirror unit group, and the first micro-mirror unit group is a micro-mirror unit group that is currently displaying data among the plurality of micro-mirror unit groups;

wherein the control device is further configured to control the DMD to perform:

determining a target bit plane corresponding to the target micro-mirror unit group in the micro-mirror unit array;

after determining the target bit plane corresponding to the target micro-mirror unit group in the micro-mirror unit array, the control device is further configured to control the DMD to perform:

based on a binary grayscale value of each micro-mirror unit of the target micro-mirror unit group, loading target data on the target bit plane to the target micro-mirror unit group, so that the target micro-mirror unit group displays based on the target data;

wherein at the end of the first period, a remaining reset display duration of each of the plurality of micro-mirror unit groups is not less than a data loading duration required for a corresponding micro-mirror unit group, and an absolute value of a difference between remaining reset display durations of any two micro-mirror unit groups among the plurality of micro-mirror unit groups is not less than the data loading duration required for the corresponding micro-mirror unit group.

15. The laser projection apparatus according to claim 14, wherein the control device is further configured to control the DMD to perform:

obtaining a data loading duration required for each of the plurality of micro-mirror unit groups;

determining a reset display duration of each of a plurality of bit planes, wherein the plurality of bit planes are determined based on a gray level of an image displayed by the micro-mirror unit array, the plurality of bit planes comprise the target bit plane;

based on the data loading duration required for each micro-mirror unit group and the reset display duration of each bit plane, determining the target bit plane corresponding to the target micro-mirror unit group.

16. The laser projection apparatus according to claim 15, wherein the control device is further configured to control the DMD to perform:

during a first data loading process for each micro-mirror unit group in the micro-mirror unit array, determining the target micro-mirror unit group based on a position sequence of the plurality of micro-mirror unit groups;

based on the data loading duration required for each micro-mirror unit group, determining a total data loading duration required for a second micro-mirror unit group among the plurality of micro-mirror unit groups, wherein the second micro-mirror unit group is not loaded with data;

determining a remaining reset display duration of the first micro-mirror unit group at the end of the first period;

determining the target bit plane based on the total data loading duration required for the second micro-mirror unit group, the remaining reset display duration of the first micro-mirror unit group, and the reset display duration of each bit plane.

17. A non-transitory computer-readable storage medium, storing computer programs, wherein the computer programs are executed by a computer to perform the image display method according to claim 1.

\* \* \* \* \*